US010016638B2

(12) United States Patent
Casebolt et al.

(10) Patent No.: US 10,016,638 B2
(45) Date of Patent: *Jul. 10, 2018

(54) ENERGY ABSORBER ASSEMBLY AND COMPONENTS THEREOF

(71) Applicant: D B Industries, LLC, Red Wing, MN (US)

(72) Inventors: Scott C. Casebolt, St. Paul Park, MN (US); David A. Schlangen, Red Wing, MN (US)

(73) Assignee: D B INDUSTRIES, LLC, Maplewood, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/860,860

(22) Filed: Sep. 22, 2015

(65) Prior Publication Data
US 2016/0023024 A1     Jan. 28, 2016

Related U.S. Application Data

(63) Continuation of application No. 13/826,876, filed on Mar. 14, 2013, now Pat. No. 9,174,073.
(Continued)

(51) Int. Cl.
*A62B 35/04* (2006.01)
*F16F 7/00* (2006.01)
(Continued)

(52) U.S. Cl.
CPC .......... *A62B 35/04* (2013.01); *A62B 35/0025* (2013.01); *A62B 35/0037* (2013.01);
(Continued)

(58) Field of Classification Search
CPC . A62B 35/04; A62B 35/0037; A62B 35/0025; A62B 35/0006; A62B 35/00;
(Continued)

(56) References Cited

U.S. PATENT DOCUMENTS

| 157,660 | A | 12/1874 | Weston |
| 523,874 | A | 7/1894 | Weston |

(Continued)

FOREIGN PATENT DOCUMENTS

| CA | 2582181 | 9/2008 |
| CH | 364180 | 9/1958 |

(Continued)

OTHER PUBLICATIONS

"ANSI Z359-Compliant Products from MSA", ID 2302-29-MC/Dec. 2008, MSA The Safety Company, 12 pages (© MSA 2008).
(Continued)

*Primary Examiner* — Daniel P Cahn

(57) ABSTRACT

An energy absorber assembly for use with a safety harness comprises a connector, a bracket assembly, a fastener, and an energy absorber. The connector is configured and arranged to operatively connect to the safety harness. The fastener operatively connects the bracket assembly and the connector, and the fastener releases the bracket assembly from the connector when subjected to a predetermined load. The energy absorber operatively connects the bracket assembly and the connector, and the energy absorber includes a first portion and a second portion that separate to absorb shock after the bracket assembly is released from the connector.

20 Claims, 18 Drawing Sheets

Related U.S. Application Data

(60) Provisional application No. 61/762,482, filed on Feb. 8, 2013.

(51) Int. Cl.
*A62B 35/00* (2006.01)
*F16C 11/04* (2006.01)
*F16B 45/04* (2006.01)

(52) U.S. Cl.
CPC .......... *A62B 35/0075* (2013.01); *F16B 45/04* (2013.01); *F16C 11/04* (2013.01); *F16F 7/006* (2013.01); *Y10T 403/32041* (2015.01)

(58) Field of Classification Search
CPC .. A62B 35/0075; A62B 35/0093; F16F 7/006; F16B 45/04
USPC ................................. 182/3, 5, 231
See application file for complete search history.

(56) References Cited

U.S. PATENT DOCUMENTS

| | | |
|---|---|---|
| 659,093 A | 10/1900 | Ockers |
| 1,363,749 A | 12/1920 | Peterson |
| 1,724,713 A | 8/1929 | Johnston |
| 1,950,289 A | 3/1934 | Benson |
| 2,268,243 A | 12/1941 | Curtis |
| 2,502,896 A | 4/1950 | Sherbrook et al. |
| 2,776,815 A | 1/1957 | Sheard |
| 2,809,804 A | 10/1957 | Sheard |
| 3,081,839 A | 3/1963 | O'Brien |
| 3,089,599 A | 5/1963 | Casella |
| 3,101,927 A | 8/1963 | Gray |
| 3,204,720 A | 9/1965 | Eitel |
| 3,879,016 A | 4/1975 | Kankkunen |
| 3,946,989 A | 3/1976 | Tsuda |
| 3,999,627 A | 12/1976 | Naka |
| 4,125,142 A | 11/1978 | Fohl |
| 4,177,962 A | 12/1979 | Hildebrandt |
| 4,421,209 A | 12/1983 | Vermette et al. |
| 4,434,869 A | 3/1984 | Roop et al. |
| 4,476,956 A | 10/1984 | Eger |
| 4,577,725 A | 3/1986 | Hunter |
| 4,589,519 A | 5/1986 | Hunter |
| 4,589,523 A | 5/1986 | Olson et al. |
| 4,598,792 A | 7/1986 | Lew et al. |
| 4,598,793 A | 7/1986 | Lew et al. |
| 4,679,656 A | 7/1987 | Lew et al. |
| 4,688,657 A | 8/1987 | Erickson |
| 4,694,934 A | 9/1987 | Erickson |
| 4,702,348 A | 10/1987 | Lew et al. |
| 4,737,065 A | 4/1988 | Ju |
| 4,793,436 A | 12/1988 | Lew et al. |
| 4,830,340 A | 5/1989 | Knitig |
| 4,877,110 A | 10/1989 | Wolner |
| 4,904,023 A | 2/1990 | Föhl |
| 4,919,403 A | 4/1990 | Bartholomew |
| 5,070,978 A | 12/1991 | Pires |
| 5,090,503 A * | 2/1992 | Bell ....................... A62B 35/04 182/5 |
| 5,131,491 A | 7/1992 | Varner et al. |
| 5,143,187 A | 9/1992 | McQuarrie et al. |
| 5,174,410 A | 12/1992 | Casebolt |
| 5,186,289 A | 2/1993 | Wolner et al. |
| 5,197,573 A | 3/1993 | De La Fuente et al. |
| 5,219,039 A | 6/1993 | Bell |
| 5,279,386 A * | 1/1994 | Cearley .............. A62B 35/0031 119/907 |
| 5,287,943 A | 2/1994 | Bell |
| 5,287,950 A | 2/1994 | Feathers et al. |
| 5,305,852 A | 4/1994 | Klokseth |
| 5,330,133 A | 7/1994 | Rasmussen |
| 5,343,975 A | 9/1994 | Riches et al. |
| 5,361,867 A | 11/1994 | Olson et al. |
| 5,400,868 A | 3/1995 | Ellis et al. |
| 5,431,447 A | 7/1995 | Bauer |
| 5,433,290 A | 7/1995 | Ellis et al. |
| 5,458,214 A | 10/1995 | Olson et al. |
| 5,458,221 A | 10/1995 | Flux et al. |
| 5,487,444 A | 1/1996 | Dennington |
| 5,487,562 A | 1/1996 | Hedderly et al. |
| 5,495,790 A | 3/1996 | Greiner |
| 5,597,055 A | 1/1997 | Han et al. |
| 5,598,900 A | 2/1997 | O'Rourke |
| 5,601,161 A | 2/1997 | Brigden |
| 5,704,645 A | 1/1998 | Arthurs et al. |
| 5,718,455 A | 2/1998 | Kawaguchi et al. |
| 5,722,612 A | 3/1998 | Feathers |
| 5,762,282 A | 6/1998 | Wolner |
| 5,799,760 A | 9/1998 | Small |
| 5,878,855 A | 3/1999 | Miyata |
| 5,927,438 A | 7/1999 | Ostrobrod |
| 5,934,423 A | 8/1999 | Kallenbach |
| 5,947,229 A | 9/1999 | Hede et al. |
| 5,971,489 A | 10/1999 | Smithson et al. |
| 6,019,304 A | 2/2000 | Skowronski et al. |
| 6,073,724 A | 6/2000 | Wolner et al. |
| 6,085,368 A | 7/2000 | Robert et al. |
| 6,135,252 A | 10/2000 | Knotts |
| 6,182,791 B1 | 2/2001 | Cope |
| 6,224,019 B1 | 5/2001 | Peterson et al. |
| 6,279,680 B1 | 8/2001 | Casebolt |
| 6,283,398 B1 | 9/2001 | Specht |
| 6,338,399 B1 | 1/2002 | Choate |
| 6,378,939 B1 | 4/2002 | Knoll et al. |
| 6,394,241 B1 | 5/2002 | Desjardins et al. |
| 6,401,887 B1 | 6/2002 | Hur |
| 6,457,556 B1 | 10/2002 | Skade et al. |
| 6,494,292 B2 | 12/2002 | Cope |
| 6,523,771 B2 | 2/2003 | Sumiyashiki |
| 6,533,066 B1 * | 3/2003 | O'Dell ................. D03D 1/0005 182/3 |
| 6,550,597 B2 | 4/2003 | Taniguchi |
| 6,655,716 B2 | 12/2003 | Riefe |
| 6,698,544 B2 | 3/2004 | Kurtgis |
| 6,715,238 B2 | 4/2004 | Zambelli et al. |
| 6,763,910 B2 | 7/2004 | Cole |
| 6,769,715 B2 | 8/2004 | Riefe et al. |
| 6,796,610 B2 | 9/2004 | Nakagawa et al. |
| 6,799,400 B2 | 10/2004 | Chuang |
| 6,810,997 B2 | 11/2004 | Schreiber et al. |
| 6,851,516 B2 | 2/2005 | Petzl et al. |
| 6,883,640 B2 | 4/2005 | Kurtgis |
| 6,913,288 B2 | 7/2005 | Schulz et al. |
| 6,918,464 B2 | 7/2005 | Renton et al. |
| 6,957,727 B2 | 10/2005 | Leung |
| 6,971,476 B2 | 12/2005 | Wolner et al. |
| 6,976,565 B2 | 12/2005 | Meernik et al. |
| 6,990,928 B2 * | 1/2006 | Kurtgis .................... B64D 1/12 119/770 |
| 7,104,371 B2 | 9/2006 | Renton |
| 7,106,205 B2 | 9/2006 | Graef et al. |
| 7,124,866 B2 | 10/2006 | Manwaring et al. |
| 7,143,877 B2 | 12/2006 | Dusserre-Telmon et al. |
| 7,146,922 B1 | 12/2006 | Morton |
| 7,163,083 B2 | 1/2007 | Argoud |
| 7,188,704 B2 | 3/2007 | Renton et al. |
| 7,237,650 B2 | 7/2007 | Casebolt |
| 7,258,324 B2 | 8/2007 | Gilman |
| 7,281,620 B2 | 10/2007 | Wolner et al. |
| 7,357,222 B2 | 4/2008 | Durbic |
| 7,392,881 B1 | 7/2008 | Choate |
| 7,445,181 B2 | 11/2008 | Knoll et al. |
| 7,448,577 B2 | 11/2008 | Sadeck |
| 7,455,155 B2 | 11/2008 | Castro Fresno |
| 7,461,727 B2 | 12/2008 | Renton |
| 7,677,360 B2 | 3/2010 | Tanaka et al. |
| 7,726,350 B2 | 6/2010 | Jennings et al. |
| 7,815,013 B2 | 10/2010 | Griffith |
| 7,857,099 B2 | 12/2010 | Choate |
| 7,866,702 B2 | 1/2011 | Murphy et al. |
| 7,909,137 B2 | 3/2011 | Green |

(56) References Cited

U.S. PATENT DOCUMENTS

| | | | |
|---|---|---|---|
| 7,946,387 B2 * | 5/2011 | Betcher | A62B 35/0093 182/231 |
| 8,181,744 B2 | 5/2012 | Parker et al. | |
| 8,251,176 B2 | 8/2012 | Meillet et al. | |
| 8,276,712 B2 | 10/2012 | Smith et al. | |
| 8,292,028 B2 | 10/2012 | Wise | |
| 8,584,799 B1 * | 11/2013 | Dennington | A62B 35/0075 182/3 |
| 8,651,235 B2 * | 2/2014 | Wood | A62B 1/14 182/191 |
| 8,678,134 B2 | 3/2014 | Wood | |
| 8,746,739 B2 | 6/2014 | Meggs et al. | |
| 9,174,073 B2 | 11/2015 | Casebolt | |
| 2001/0004431 A1 | 6/2001 | Crorey et al. | |
| 2002/0134618 A1 | 9/2002 | Timmermans | |
| 2002/0179372 A1 | 12/2002 | Schreiber et al. | |
| 2003/0111293 A1 | 6/2003 | Desjardins et al. | |
| 2004/0065508 A1 | 4/2004 | Avots et al. | |
| 2004/0145098 A1 | 7/2004 | Thaler | |
| 2005/0039981 A1 | 2/2005 | Wooster et al. | |
| 2005/0051659 A1 | 3/2005 | Wolner et al. | |
| 2005/0082114 A1 * | 4/2005 | Casebolt | A62B 35/0037 182/3 |
| 2005/0217937 A1 | 10/2005 | Rohlf | |
| 2005/0269153 A1 * | 12/2005 | Casebolt | A62B 35/0093 182/3 |
| 2005/0269154 A1 | 12/2005 | Siemienowicz | |
| 2005/0284694 A1 | 12/2005 | Faye et al. | |
| 2006/0011415 A1 | 1/2006 | Fischer et al. | |
| 2006/0048723 A1 * | 3/2006 | Rohlf | A62B 35/04 119/857 |
| 2006/0113147 A1 * | 6/2006 | Harris, Jr. | A62B 35/0093 182/3 |
| 2007/0023231 A1 | 2/2007 | Gorman et al. | |
| 2007/0068731 A1 | 3/2007 | Griffith | |
| 2007/0144830 A1 | 6/2007 | Mastenbroek | |
| 2007/0163835 A1 | 7/2007 | Mastenbroek | |
| 2007/0205066 A1 | 9/2007 | Vinayagamurthy et al. | |
| 2007/0209868 A1 * | 9/2007 | Betcher | A62B 35/0025 182/3 |
| 2007/0215410 A1 | 9/2007 | Ecker | |
| 2007/0261921 A1 | 11/2007 | Gal et al. | |
| 2008/0035423 A1 | 2/2008 | Meillet et al. | |
| 2008/0041661 A1 | 2/2008 | Meillet et al. | |
| 2008/0060872 A1 | 3/2008 | Wise | |
| 2008/0128221 A1 | 6/2008 | Rogge | |
| 2008/0156587 A1 | 7/2008 | Lara | |
| 2008/0156839 A1 * | 7/2008 | Betcher | A45F 3/14 224/630 |
| 2008/0179136 A1 | 7/2008 | Griffith | |
| 2008/0230311 A1 * | 9/2008 | Fusco | A62B 35/0062 182/37 |
| 2008/0251320 A1 | 10/2008 | Lara | |
| 2008/0289903 A1 | 11/2008 | Kuhnert | |
| 2009/0071749 A1 | 3/2009 | Burlaud et al. | |
| 2009/0071750 A1 | 3/2009 | Simard et al. | |
| 2009/0084883 A1 | 4/2009 | Casebolt et al. | |
| 2009/0127396 A1 | 5/2009 | Jordan | |
| 2009/0133977 A1 | 5/2009 | Warren | |
| 2009/0139797 A1 | 6/2009 | Rastegar et al. | |
| 2009/0173578 A1 | 7/2009 | Renton et al. | |
| 2009/0178887 A1 | 7/2009 | Reeves et al. | |
| 2009/0194366 A1 | 8/2009 | Parker et al. | |
| 2009/0211846 A1 | 8/2009 | Taylor | |
| 2009/0211847 A1 | 8/2009 | Balquist et al. | |
| 2009/0223744 A1 | 9/2009 | Dowie | |
| 2009/0235425 A1 | 9/2009 | Walker et al. | |
| 2009/0255756 A1 | 10/2009 | Green | |
| 2009/0277719 A1 | 11/2009 | Clough | |
| 2010/0012424 A1 | 1/2010 | Krauss | |
| 2010/0025157 A1 * | 2/2010 | Casebolt | A62B 35/0093 182/231 |
| 2010/0065370 A1 | 3/2010 | Frauendorf | |
| 2010/0096230 A1 | 4/2010 | Humfeldt et al. | |
| 2010/0109217 A1 | 5/2010 | Ruthinowski et al. | |
| 2010/0122874 A1 | 5/2010 | Harris, Jr. | |
| 2010/0163338 A1 * | 7/2010 | Wood | A62B 35/04 182/6 |
| 2010/0181155 A1 | 7/2010 | Bohnet et al. | |
| 2010/0187040 A1 | 7/2010 | Siemienowicz | |
| 2010/0219016 A1 | 9/2010 | Meillet | |
| 2010/0224448 A1 | 9/2010 | Wolner et al. | |
| 2010/0226748 A1 | 9/2010 | Wolner et al. | |
| 2010/0236867 A1 | 9/2010 | Jones et al. | |
| 2010/0243837 A1 | 9/2010 | Cox | |
| 2010/0252366 A1 | 10/2010 | Jones et al. | |
| 2010/0270107 A1 | 10/2010 | Ruis | |
| 2010/0282541 A1 | 11/2010 | Renton et al. | |
| 2011/0031080 A1 | 2/2011 | Cahis I Carola | |
| 2011/0042165 A1 | 2/2011 | Griffith | |
| 2011/0042533 A1 | 2/2011 | Austin | |
| 2012/0205478 A1 * | 8/2012 | Balquist | A62B 35/04 242/379.1 |
| 2013/0025968 A1 | 1/2013 | Smith et al. | |
| 2013/0104351 A1 | 5/2013 | Casebolt | |
| 2013/0104374 A1 * | 5/2013 | Schlangen | F16B 45/02 29/525.01 |
| 2013/0105246 A1 | 5/2013 | Schlangen et al. | |
| 2013/0105247 A1 | 5/2013 | Casebolt | |
| 2013/0292219 A1 | 11/2013 | Perner | |

FOREIGN PATENT DOCUMENTS

| | | |
|---|---|---|
| CN | 2042362 | 8/1989 |
| CN | 2101505 | 4/1992 |
| CN | 2279932 | 4/1998 |
| DE | 177841 | 3/1905 |
| DE | 29 19 216 A1 | 11/1980 |
| DE | 3300266 | 1/1983 |
| DE | 198 18 688 C1 | 1/2000 |
| DE | 201 08 777 U1 | 8/2001 |
| DE | 203 06 119 U1 | 6/2003 |
| DE | 102 10 969 A1 | 10/2003 |
| DE | 20 2006 020 127 U1 | 11/2007 |
| DE | 20 2007 013 135 U1 | 4/2008 |
| EP | 0 247 818 A2 | 12/1987 |
| FR | 1.208.895 A | 2/1960 |
| FR | 2654940 A1 | 5/1991 |
| GB | 238302 | 8/1925 |
| GB | 999553 A | 7/1965 |
| GB | 2 256 413 A | 12/1992 |
| GB | 2 279 636 A | 1/1995 |
| GB | 2 306 107 A | 4/1997 |
| GB | 2466460 | 6/2010 |
| WO | WO 92/13601 | 8/1992 |
| WO | WO 97/12786 | 4/1997 |
| WO | WO 2006/094486 A1 | 9/2006 |
| WO | 20070071418 | 6/2007 |
| WO | WO 2008/008225 A2 | 1/2008 |
| WO | WO2009/047470 A1 | 4/2009 |
| WO | 2012045144 | 4/2012 |
| WO | 2013063384 | 5/2013 |

OTHER PUBLICATIONS

APTURA "Instructions for Field Line Replacement on the APTURA™ LT12 SRL", Bulletin 2301-30, MSA (FP), 1 page (© MSA 2003).

"APTURA™ LT30 Self-Retracting Lanyard", http://msafallprotection.com/product16592.html, MSA The Safety Company, 2 pages (Known of prior to filing of present application. Printed Sep. 17, 2010) (© MSA 2010).

"APTURA™ LT30 Self-Retracting Lanyard [Advanced Performance Technology]", ID 2300-69/Apr. 2004, MSA (FP), 4 pages (© MSA 2004).

"APTURA™ LT30 Self-Retracting Lanyard (SRL) Features & Benefits", 2301-54, MSA (FP), 1 page (© MSA 2004).

"APTURA™ LT12 Self Retracting Lanyard User Instructions for Field Line Replacement", P/N 10044813, MSA (FP), 8 pages (© 2003 MSA).

(56) References Cited

OTHER PUBLICATIONS

"APTURA™ LT12 Self Retracting Lanyard [Advanced Performance Technology]", ID 2300-51, Rev. A/Feb. 2003, MSA (FP), 4 pages (© 2003 MSA).
DBI SALA®, User Instruction Manual Lanyards with Integral Energy Absorbers and Energy Absorber Components Used in Personal Fall Arrest Systems (ANSI A359.1). Form: 5902143 Rev: K, © Copyright 2009, DB Industries, Inc. 1 page.
Fall Arrest Block UB157, ISC (International Safety Components Ltd.), Bangor, Gwynedd, United Kingdom, 4 pages (Printed Sep. 14, 2007).
FALLSTOP® Safety, Bornack, pp. 55-64 (© Bornack 2007).
Fiche technique, Tractel Group, 3 pages (© TRACTEL S.A.S. 2003).
International Search Report for PCT/US2004/027243 dated Dec. 2, 2004.
International Search Report for PCT/US2010/054186 dated Mar. 3, 2011.
International Search Report for PCT/US2014/01060 dated Jul. 24, 2014, 9 pages.
MSA Rose Dyna-Lock Self Retracting Lanyards, 2 pages (Printed Jan. 16, 2013. Known of prior to filing of present application).
MSA Rose User Instructions DYNA-LOCK® Self-Retracting Lanyard, © 1994-2000 Rose Manufacturing Company, PN 622617, Rev. C, 28 pages, Rose Manufacturing Company, Pittsburgh, PA.
Miller TurboLite™ Personal Fall Limiter brochure, Honeywell, 4 pages (known of prior to filing of present application).
Miller TurboLite™ Personal Fall Limiter, photographs of product, 2 photographs taken Jan. 2013 (product known of prior to filing of present application).
Photographs of fall arrest block device, International Safety Components Ltd., Bangor, Gwynedd, United Kingdom, 11 pages (known of prior to filing of present application).
Protecta, Instructions for Use AD Series Self Retracting Lifelines, Form 5902290 Rev: F, 2 pages (© Protecta 2005).
Reliance Connector 4007-65, Reliance Industries—Product Details, 1 page (Printed Jan. 23, 2013. Known of prior to filing present application).
Reliance Connector 400765, "Skylock™ SRL's—Proven Performance, Built to Last", 1 page (Known of prior to filing present application).
Reliance 4007-65 Connector, "StopLite Self Retracting" Product Data Sheet, Rev. A 7.11, 1 page (Known of prior to filing present application.).
Reliance Fall Protection—Instructions for Use, 4XXX Series Skyloc™ Self Retracting Lifelines, 28 pages, Copyright 2011 Reliance Fall Protection, 4006-62 Rev B, Reliance Fall Protection, Reliance Industries, Deer Park, Texas.
Reliance Connector—Photographs of Connector 4007-65 product (2 photos) (Product known of prior to filing of present application).
"Retrieval Instructions—to Engage and Disengage the Function Winch—Retractable Type Fall Arrester—AD515, EN360-EN1496 Classe B", Protecta® International, Carros, Cedex, France, 4 pages (known of prior to filing of present application).
"Sealed Self Retracting Lifeline—Revolutionary Sealed Design Stands-Up to Even the Harshest Environments for Ultimate Safety and Reliability!", DBI/SALA®, 2 pages (© 2007—Capital Safety).
User Instruction Manual Rollgliss® Rescue Emergency Descent Device with Manual Retract, High-Speed, DBI/SALA®, Form 5902152 Rev: A, 12 pages (© 2000 DB Industries, Inc.).
"User Instruction Manual Fisk Descender", DBI SALA®, Form 5902142 Rev: D, 36 pages (© 2002 DB Industries, Inc.).
User Instruction Manual for Rescue/Personnel Riding System Rollgliss R350, DBI/SALA®, Form 5902125 Rev: A, 28 pages (© 2004, DB Industries, Inc.).
"User Instruction Manual—Sealed Self Retracting Lifelines", DBI/SALA®, Form 5902122 Rev: G, 26 pages (© 2004—DB Industries, Inc.).
"User Instruction Manual Rescumatic® Emergency Escape Device and Rescue Cradle", DBI SALA®, Form 5906277 Rev: F, 16 pages (© 2005, DB Industries, Inc.).
"User Instructions Manual Self Retracting Lifelines", DBI SALA®, 38 pages Form: 5902101C Rev: I (© 2007, DB Industries, Inc.).
User Instruction Manual Rollgliss® Rescue Emergency Descent Device with Auto-Retract, DBI SALA®, Form No. 5902105 Rev. B, 16 pages (© 2008, D B Industries, Inc.).
U.S. Appl. No. 13/463,986, entitled "Energy Absorber", filed May 4, 2012.
Restriction Requirement for U.S. Appl. No. 13/826,876 dated May 5, 2014 (6 pgs).
Office Action for U.S. Appl. No. 13/826,876 dated Aug. 5, 2014 (12 pgs).
Notice of Allowance for U.S. Appl. No. 13/826,876 dated Jun. 24, 2015 (14 pgs).
Restriction Requirement for U.S. Appl. No. 13/827,098 dated Apr. 5, 2016 (5 pgs).
Office Action for U.S. Appl. No. 13/827,098 dated Jan. 11, 2017 (12 pgs).
Notice of Allowance for U.S. Appl. No. 13/827,098 dated Sep. 14, 2017 (15 pgs).
International Search Report for PCT/US2014/010074 dated Aug. 26, 2014 (4 pgs).

\* cited by examiner

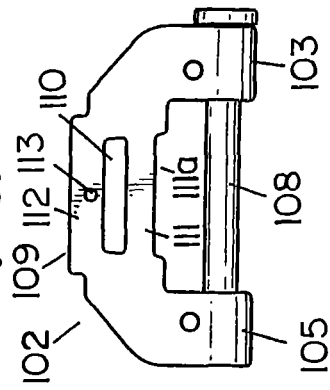
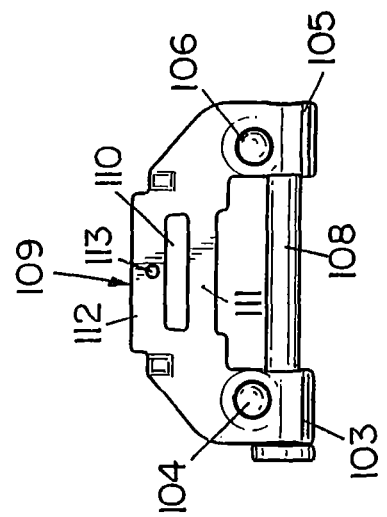
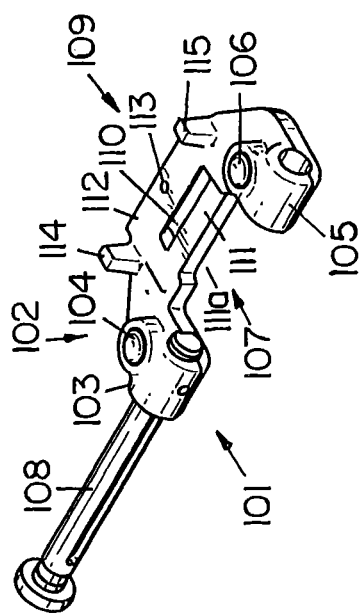
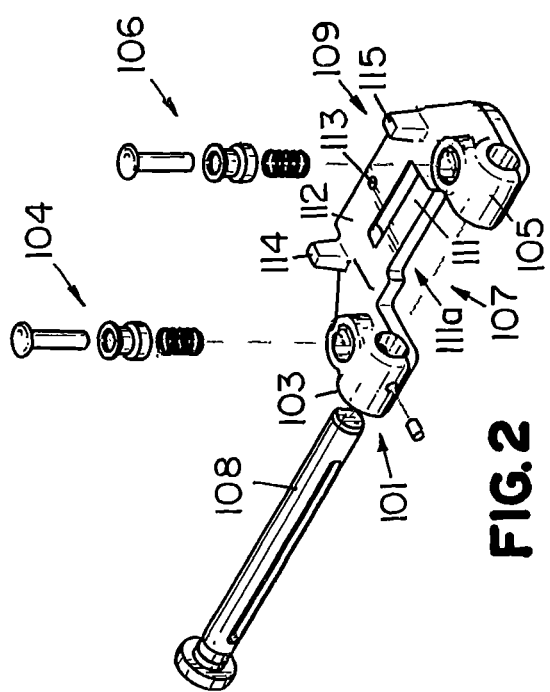

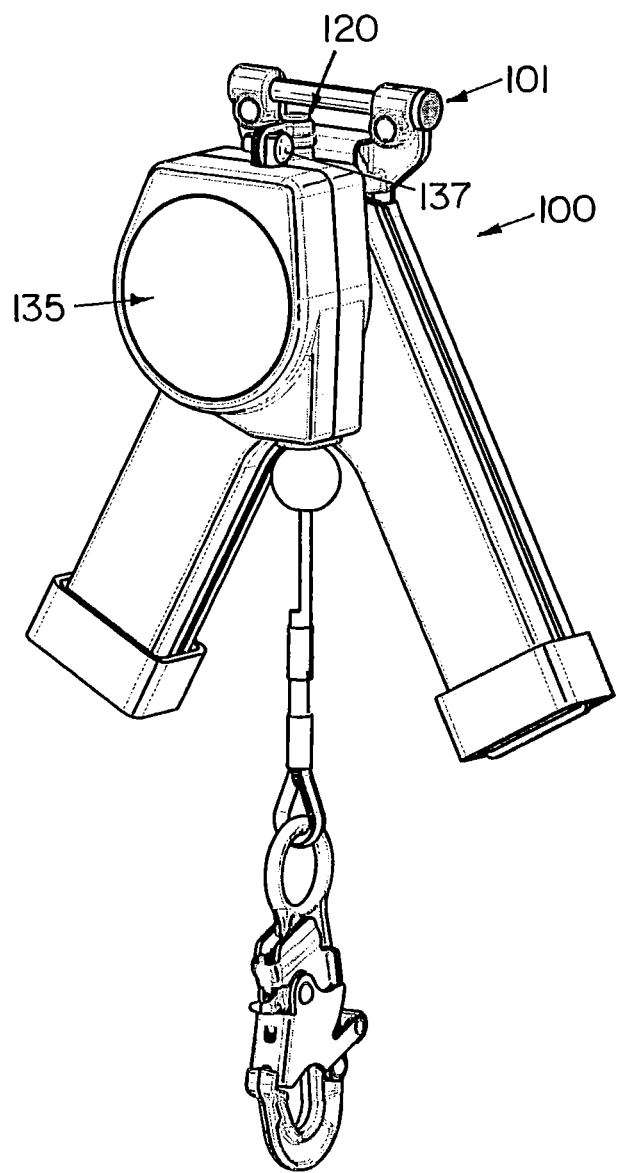

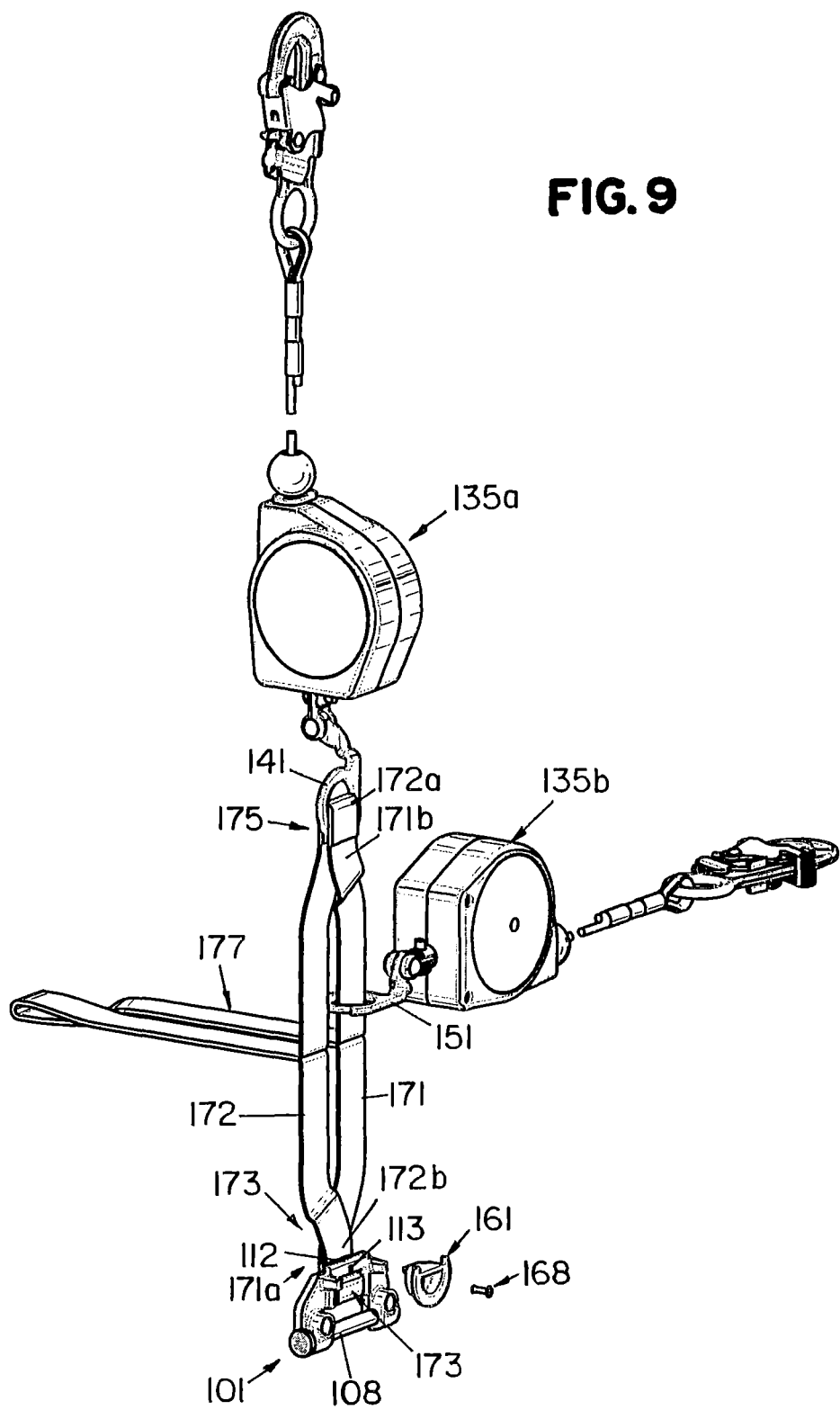

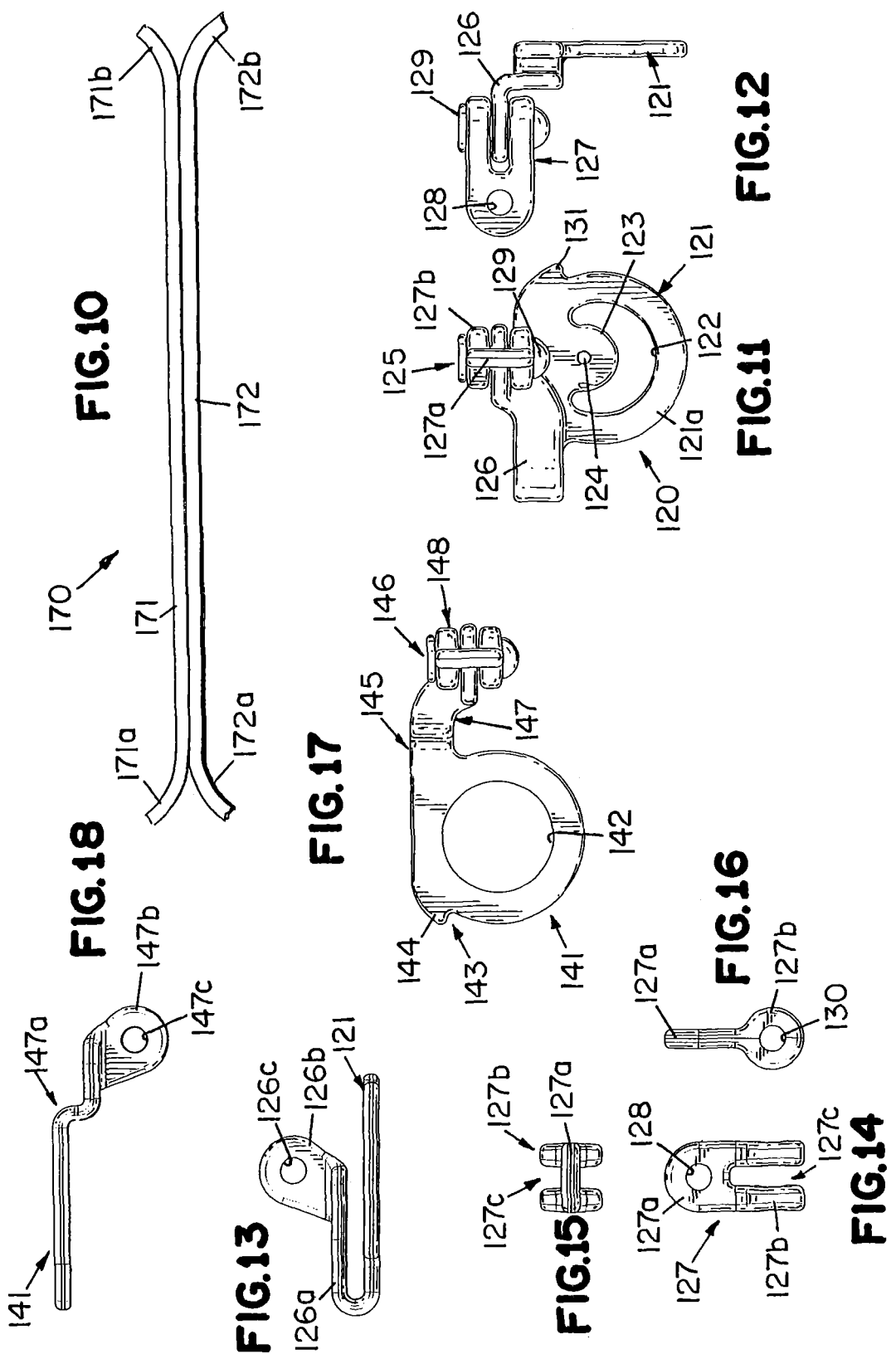

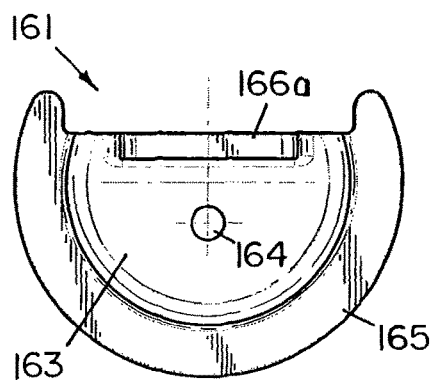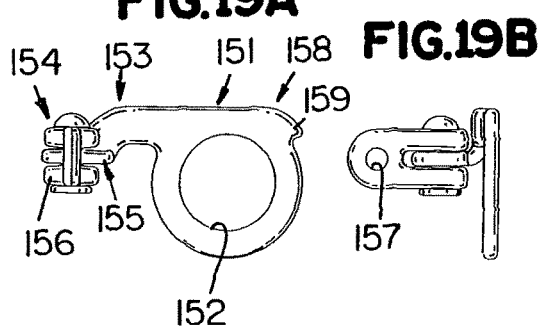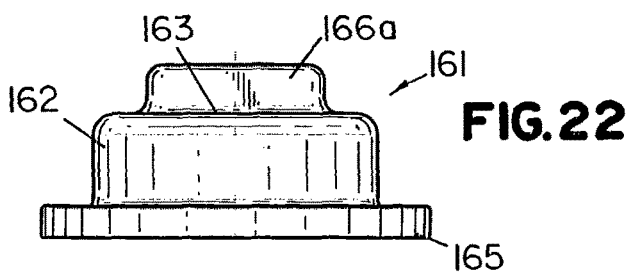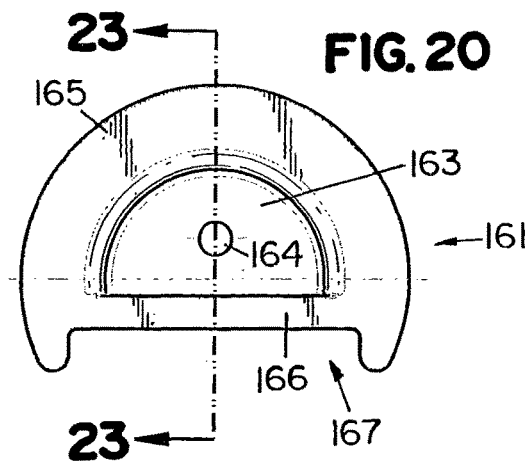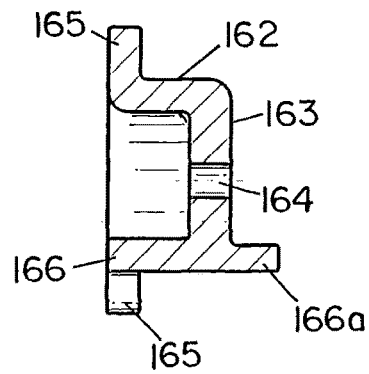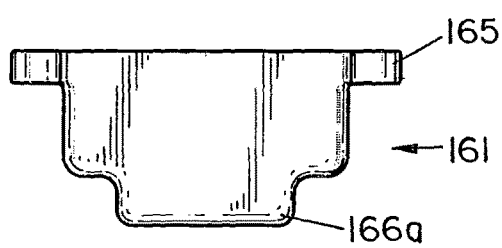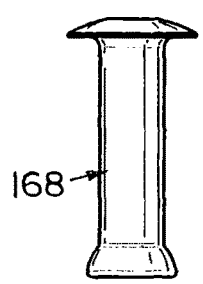

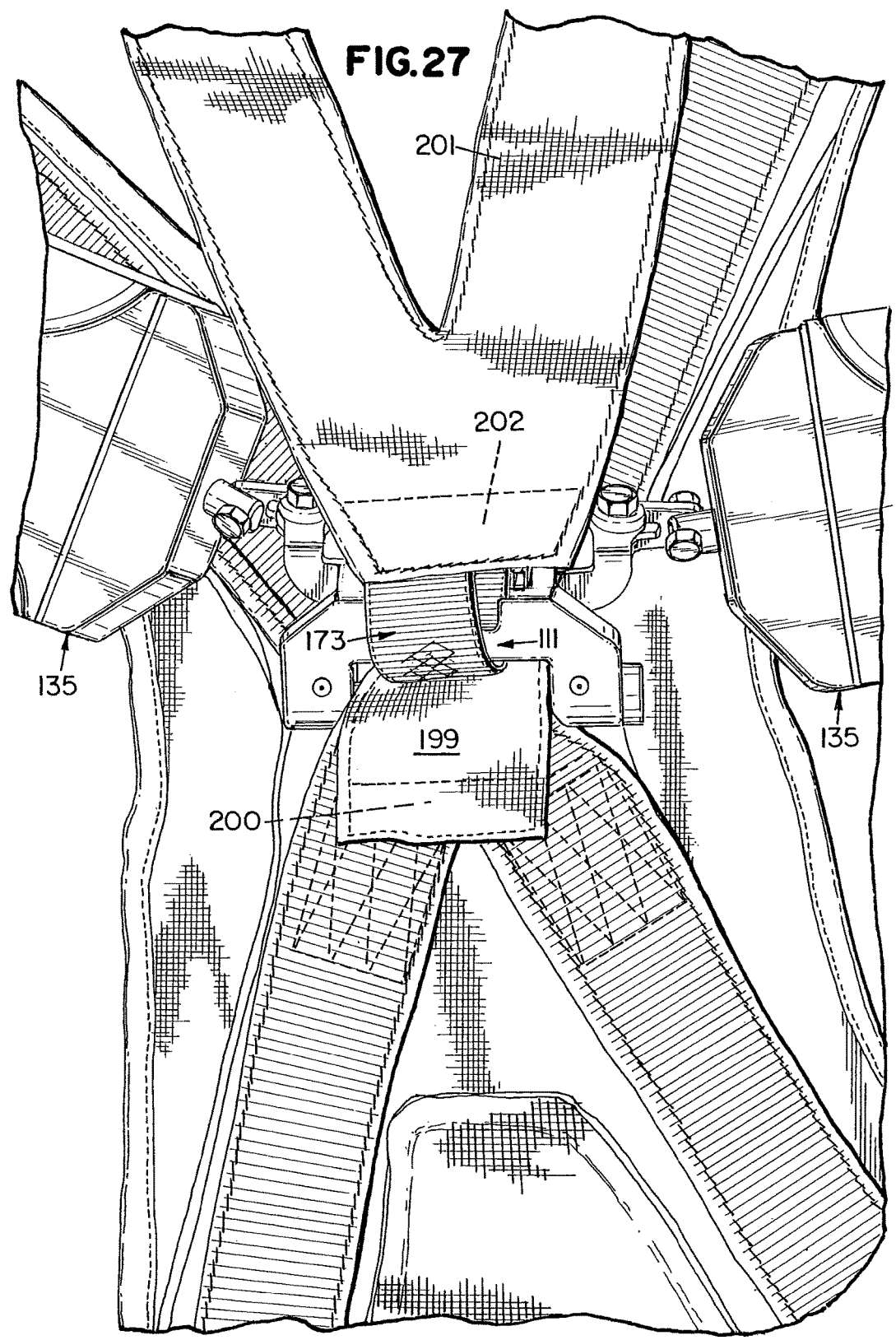

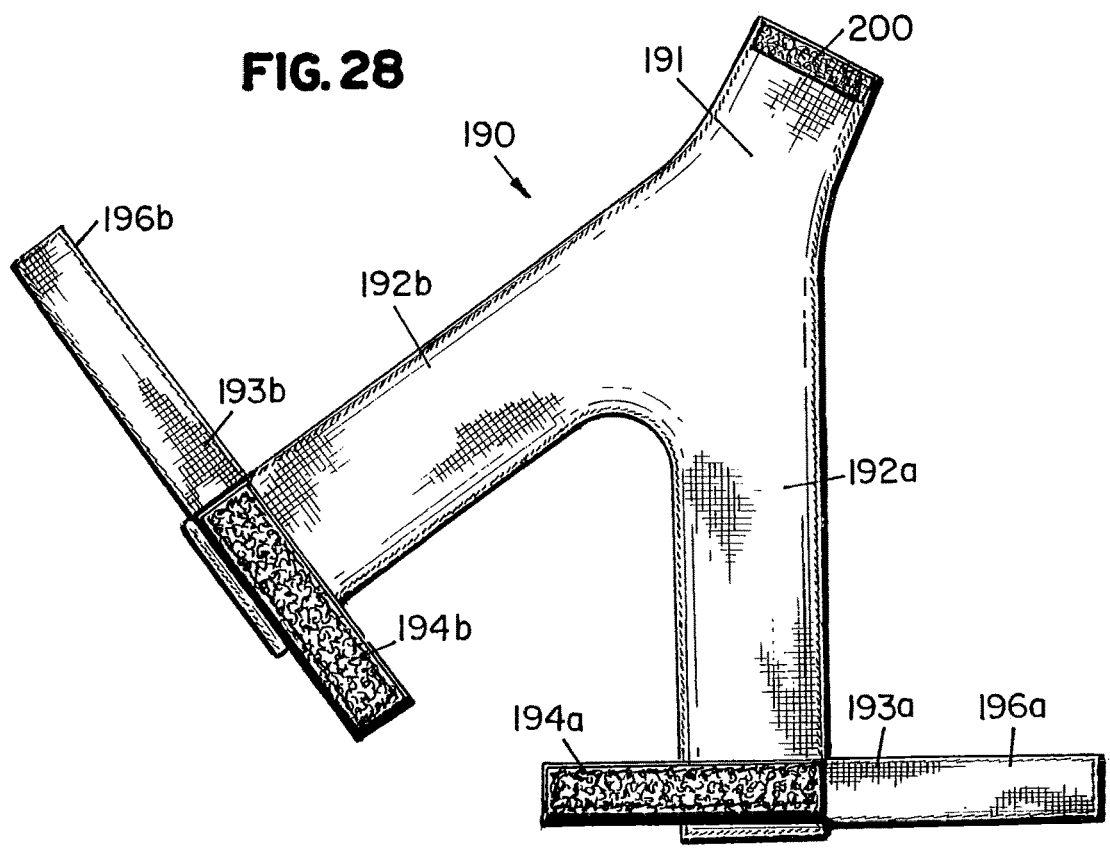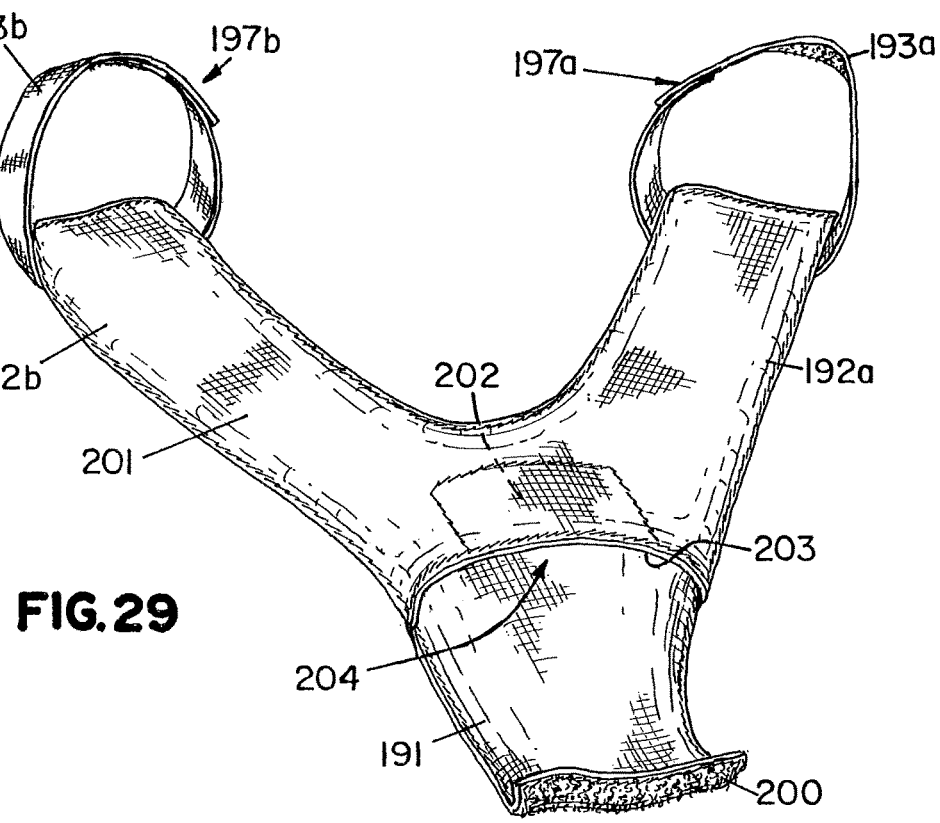

ENERGY ABSORBER ASSEMBLY AND COMPONENTS THEREOF

CROSS-REFERENCE TO RELATED APPLICATIONS

This application is a continuation of U.S. application Ser. No. 13/826,876, filed Mar. 14, 2013, which claims the benefit of U.S. Provisional Application Ser. No. 61/762,482, filed Feb. 8, 2013, which are incorporated in their entirety herein by reference.

BACKGROUND OF THE INVENTION

To protect workers who work at heights or are at risk of falling distances, lifelines interconnecting support structures and safety harnesses donned by workers are commonly used. Examples of lifelines include but are not limited to self-retracting lifelines, lanyards, and other suitable lifelines. If a fall event occurs, the lifeline limits the distance the worker could fall, however, injury to the worker could still occur if, for example, the fall distance before the lifeline becomes taut is significant. Energy absorbers are typically used in conjunction with such fall arrest equipment to provide a more gradual, less abrupt stop, which assists in preventing or reducing injuries because energy absorbers absorb some of the kinetic energy of the falling body.

Energy absorbers could interfere with the operation of such fall arrest equipment, especially if they are relatively large and/or are in positions where they could easily become tangled with the lifelines, safety harnesses, etc. Therefore, the present invention addresses such problems because it is relatively compact and connects securely to the safety harness to reduce the risk of it interfering with other components of the fall arrest equipment.

For the reasons stated above and for other reasons stated below, which will become apparent to those skilled in the art upon reading and understanding the present specification, there is a need in the art for an energy absorber assembly and components thereof.

BRIEF SUMMARY OF THE INVENTION

The above-mentioned problems associated with prior devices are addressed by embodiments of the present invention and will be understood by reading and understanding the present specification. The following summary is made by way of example and not by way of limitation. It is merely provided to aid the reader in understanding some of the aspects of the invention.

In one embodiment, an energy absorber assembly for use with a safety harness comprises a connector, a bracket assembly, a fastener, and an energy absorber. The connector is configured and arranged to operatively connect to the safety harness. The fastener operatively connects the bracket assembly and the connector, and the fastener releases the bracket assembly from the connector when subjected to a predetermined load. The energy absorber operatively connects the bracket assembly and the connector, and the energy absorber includes a first portion and a second portion that separate to absorb shock after the bracket assembly is released from the connector.

In one embodiment, an energy absorber assembly for use with a safety harness comprises a fastener, a connector, a bracket assembly, and an energy absorber. The connector is configured and arranged to operatively connect to the safety harness. The bracket assembly includes a base and a lifeline connector. The base has a slot forming a tab portion with an aperture and a bar portion. The aperture is configured and arranged to receive the fastener. The bar portion is configured and arranged to be engaged by the energy absorber. The lifeline connector is configured and arranged to engage a lifeline. The fastener operatively connects the bracket assembly and the connector. The fastener releases the bracket assembly from the connector when subjected to a predetermined load. The energy absorber operatively connects the bracket assembly and the connector and includes a first portion and a second portion that separate to absorb shock after the bracket assembly is released from the connector.

BRIEF DESCRIPTION OF THE DRAWINGS

The present invention can be more easily understood, and further advantages and uses thereof can be more readily apparent, when considered in view of the detailed description and the following Figures in which:

FIG. 1 is a front perspective view of a connector in an open position, the connector being a component of an energy absorber assembly constructed in accordance with the present invention;

FIG. 2 is an exploded front perspective view of the connector shown in FIG. 1;

FIG. 3 is a rear view of the connector shown in FIG. 1 in a closed position;

FIG. 4 is a front view of the connector shown in FIG. 1 in a closed position;

FIG. 5 is a front perspective view of an energy absorber assembly constructed in accordance with the present invention;

FIG. 9 is a front perspective view of the energy absorber assembly shown in FIG. 7 illustrating an energy absorbing position;

FIG. 10 is a schematic view of an energy absorber component of an energy absorber assembly constructed in accordance with the present invention;

FIG. 11 is a front view of a bracket assembly component of an energy absorber assembly constructed in accordance with the present invention;

FIG. 12 is a side view of the bracket assembly shown in FIG. 11;

FIG. 13 is a bottom view of base of the bracket assembly shown in FIG. 11;

FIG. 14 is a side view of a swivel portion of the bracket assembly shown in FIG. 11;

FIG. 15 is a front view of the swivel portion shown in FIG. 14;

FIG. 16 is a side view of the swivel portion rotated 90 degrees from that shown in FIG. 14;

FIG. 17 is a front view of a first base of another embodiment bracket assembly component of an energy absorber assembly constructed in accordance with the present invention;

FIG. 18 is a top view of the first base shown in FIG. 17;

FIG. 19A is a front view of a second base used with the first base shown in FIG. 17;

FIG. 19B is a side view of the second base shown in FIG. 19A;

FIG. 20 is a front view of a base connector for interconnecting the first base shown in FIG. 17 and the second base shown in FIG. 19A;

FIG. 21 is a bottom view of the base connector shown in FIG. 20;

FIG. 22 is a top view of the base connector shown in FIG. 20;

FIG. 23 is a cross-sectional view of the base connector taken along the lines 23-23 in FIG. 20;

FIG. 24 is a rear view of the base connector shown in FIG. 20;

FIG. 25 is a side view of a fastener used with the base connector shown in FIG. 20;

FIG. 27 is a rear view of a cover of the energy absorber assembly shown in FIG. 26;

FIG. 28 is a front view of the cover shown in FIG. 27;

FIG. 29 is a rear view of the cover shown in FIG. 27;

In accordance with common practice, the various described features are not drawn to scale but are drawn to emphasize specific features relevant to the present invention. Reference characters denote like elements throughout the Figures and the text.

DETAILED DESCRIPTION OF THE INVENTION

Figure 6:
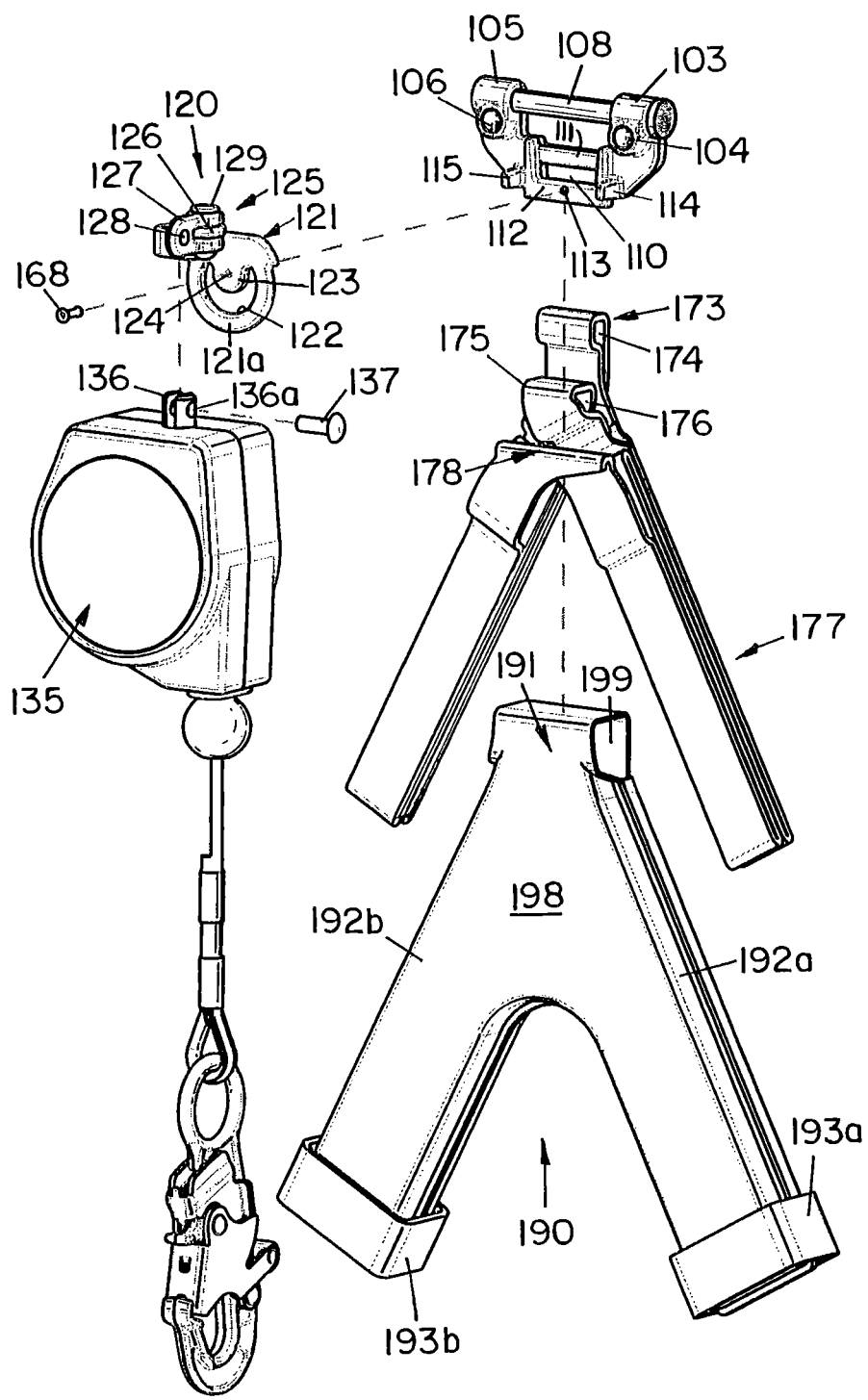
FIG. 6 is an exploded front perspective view of the energy absorber assembly shown in FIG. 5.

In the following detailed description, reference is made to the accompanying drawings, which form a part hereof, and in which is shown by way of illustration embodiments in which the inventions may be practiced. These embodiments are described in sufficient detail to enable those skilled in the art to practice the invention, and it is to be understood that other embodiments may be utilized and mechanical changes may be made without departing from the spirit and scope of the present invention. The following detailed description is, therefore, not to be taken in a limiting sense, and the scope of the present invention is defined only by the claims and equivalents thereof.

Embodiments of the present invention provide for an energy absorber assembly and components thereof.

One embodiment energy absorber assembly 100 includes a connector 101, a bracket assembly 120, an energy absorber 170, and a cover 190. Although shown with a self-retracting lifeline 135 operatively connected to the bracket assembly 120, it is recognized that any suitable type of lifeline could be used and operatively connected to the bracket assembly 120 with or without modifications to the bracket assembly.

The connector 101 is configured and arranged to operatively connect a safety harness, preferably proximate its dorsal D-ring as is well known in the art, the energy absorber 170, and the self-retracting lifeline 135 via the bracket assembly 120. Generally, as shown in at least FIGS. 1-4, the connector 101 includes a base 102, which is generally U-shaped with a first end 103, a second end 105, and an intermediate portion 109 interconnecting the ends 103 and 105. The ends 103 and 105 define an opening 107 therebetween. The first end 103 includes a first locking assembly 104 and the second end 105 includes a second locking assembly 106 configured and arranged to selectively engage a gate 108. The gate 108 extends through bores in the ends 103 and 105 and spans the opening 107 in a locked position, in which the locking assemblies 104 and 106 prevent the gate 108 from moving. In an unlocked position, in which the locking assemblies 104 and 106 are compressed, the gate 108 slides out of the bore in end 105 to allow access to the opening 107. The connector 101 is similar to that disclosed in U.S. patent application Ser. No. 13/660,532, which is hereby incorporated by reference in its entirety. This aspect of the connector 101 is described in detail in U.S. patent application Ser. No. 13/660,532.

The intermediate portion 109, which differs from the connector disclosed in U.S. patent application Ser. No. 13/660,532, includes a slot 110 forming a first bar portion 111 proximate the opening 107 and a second bar portion 112 opposite the ends 103 and 105. The first bar portion 111 includes a recessed portion 111a on a side proximate the ends 103 and 105, and the second bar portion 112 includes an aperture 113 proximate its center. A first protrusion 114 extends outwardly at approximately a right angle proximate the second bar portion 112 and the first side 103, and a second protrusion 115 extends outwardly at approximately a right angle proximate the second bar portion 112 and the second side 105.

In this embodiment, a bracket assembly 120 is used. As shown in at least FIGS. 5 and 6, the bracket assembly 120 includes a circular base 121 with a crescent shaped slot 122 proximate its bottom that forms a bar portion 121a proximate the bottom of the slot 122 and a tab portion 123 proximate the top of the slot 122. The tab portion 123 extends downward relative to the base 121 and includes an aperture 124. One side of the base 121 includes a swivel connector portion 125. The swivel connector portion 125 includes a stationary portion 126, a swivel portion 127, and a fastener 129 interconnecting the portions 126 and 127. The stationary portion 126 includes an extension arm 126a, which extends outward in a U-shaped manner from proximate the top of the base 121, and a flange 126b, which extends laterally outward from the extension arm 126a proximate the center top of the base 121 and includes and aperture 126c. This is shown in at least FIGS. 11-13. The swivel portion 127 includes a tab portion 127a and a two prong portion 127b, which includes two legs extending outward from the tab portion 127a at a distance from one another to form an opening 127c therebetween. The tab portion 127a includes an aperture 128 and the legs of the two prong portion 127b include aligning apertures 130. The opening 127c is configured and arranged to receive the flange 126b and the apertures 126c and 130 align. The base 121, including the stationary portion 126, and the swivel portion 127 are preferably made of alloy steel. The fastener 129, which could be a rivet as shown, extends through the apertures 126c and 130 to connect the stationary portion 126 and the swivel portion 127 in a manner that allows the swivel portion 127 to swivel or pivot relative to the stationary portion 126. The other side of the base 121, opposite the swivel portion 127, includes a shoulder portion 131 extending outward therefrom. A fastener 168, such as a rivet as shown, extends through the aperture 124 of the bracket assembly 120 and the aperture 113 of the connector 101. The bracket assembly 120 is pivotable about the fastener 168 relative to the connector 101, and the swivel connector portion 125 and the shoulder portion 131 contact the respective protrusions 114 and 115, which act likes stops to limit rotation of the bracket assembly 120. A lifeline, such as a self-retracting lifeline 135 including a connector portion 136, is operatively connected to the bracket assembly 120 by a fastener 137 extending through the aperture 128 of the swivel portion 127 and the apertures 136a of the connector portion 136. This bracket assembly 120 provides a universal joint configuration allowing the lifeline to be orientated in many directions with little restriction.

The energy absorber 170 includes a first portion 171 and a second portion 172 operatively connected by any suitable means well known in the art. One example of how the portions 171 and 172 could be connected is described in U.S. patent application Ser. No. 13/656,119 filed Oct. 19, 2012 and U.S. patent application Ser. No. 13/463,986 filed May 4, 2012, which are hereby incorporated by reference in their entirety. The energy absorber 170 is schematically illustrated in an unassembled position in FIG. 10. The first portion 171 has a first end 171a and a second end 171b, and the second portion 172 has a first end 172a and a second end 172b. The portions 171 and 172 are operatively connected proximate an intermediate portion 177 of the energy absorber 170. The first ends 171a and 172a are positioned proximate one another and the second ends 171b and 172b are positioned proximate one another.

To connect the energy absorber 170 to the connector 101, one of the first end 171a of the first portion 171 and the second end 172b of the second portion 172 is positioned proximate the recessed portion 111a of the first bar portion 111, the other of the first end 171a of the first portion 171 and the second end 172b of the second portion 172 is positioned proximate the slot 110, and the ends 171a and 172b are operatively connected, such as by stitching, as a first connection 173 to form a first loop 174 about the first bar portion 111.

To connect the energy absorber 170 to the bracket assembly 120, one of the second end 171b of the first portion 171 and the first end 172a of the second portion 172 is inserted through the slot 122 from one side of the base 121, the other of the second end 171b of the first portion 171 and the first end 172a of the second portion 172 is positioned proximate the other side of the base 121, and the ends 171b and 172a are operatively connected, such as by stitching, as a second connection 175 to form a second loop 176 about the bar portion 121a of the base 121.

Figure 30:
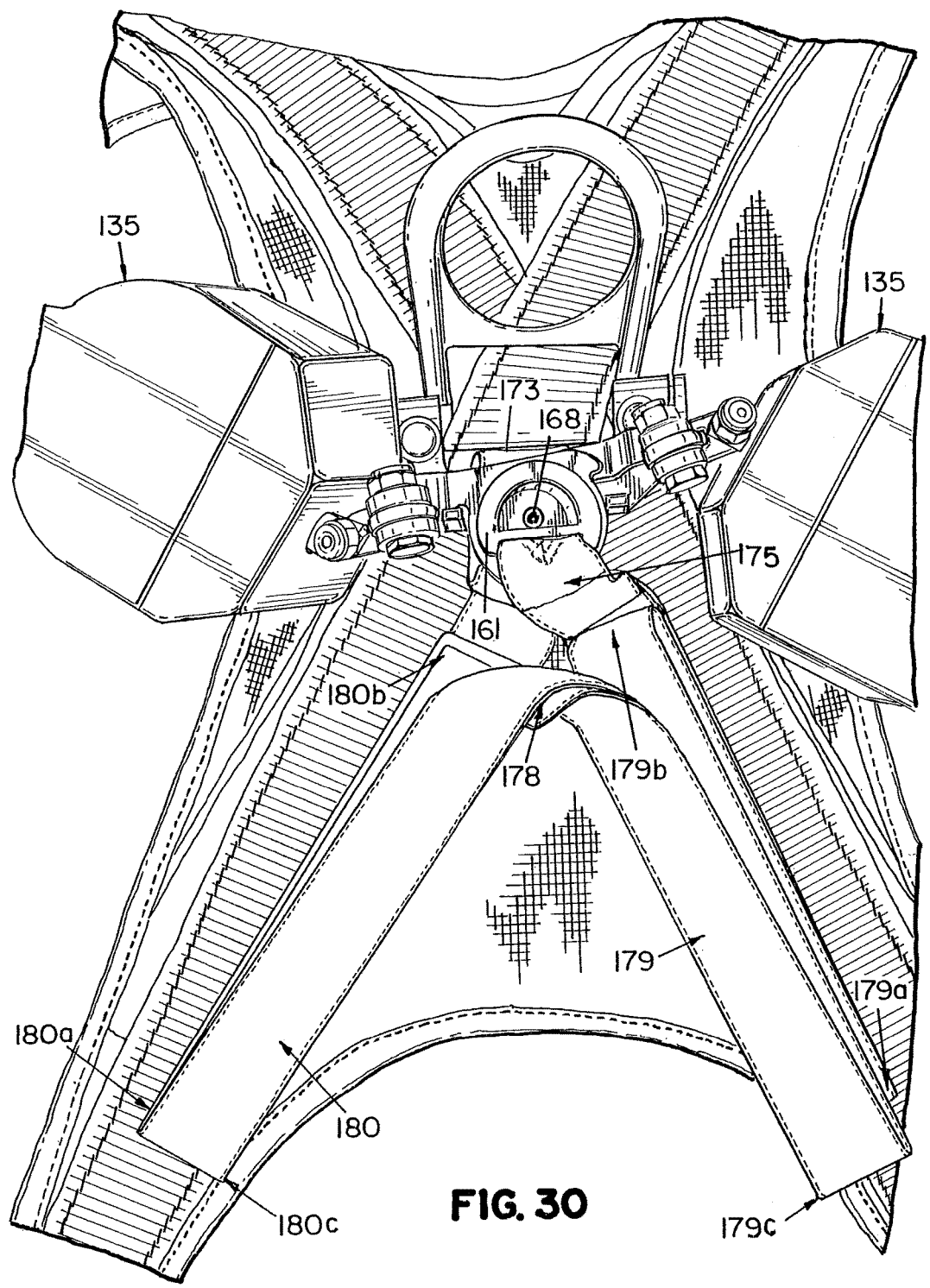
FIG. 30 is a front view of an energy absorber of the energy absorber assembly shown in FIG. 26.
Figure 31:
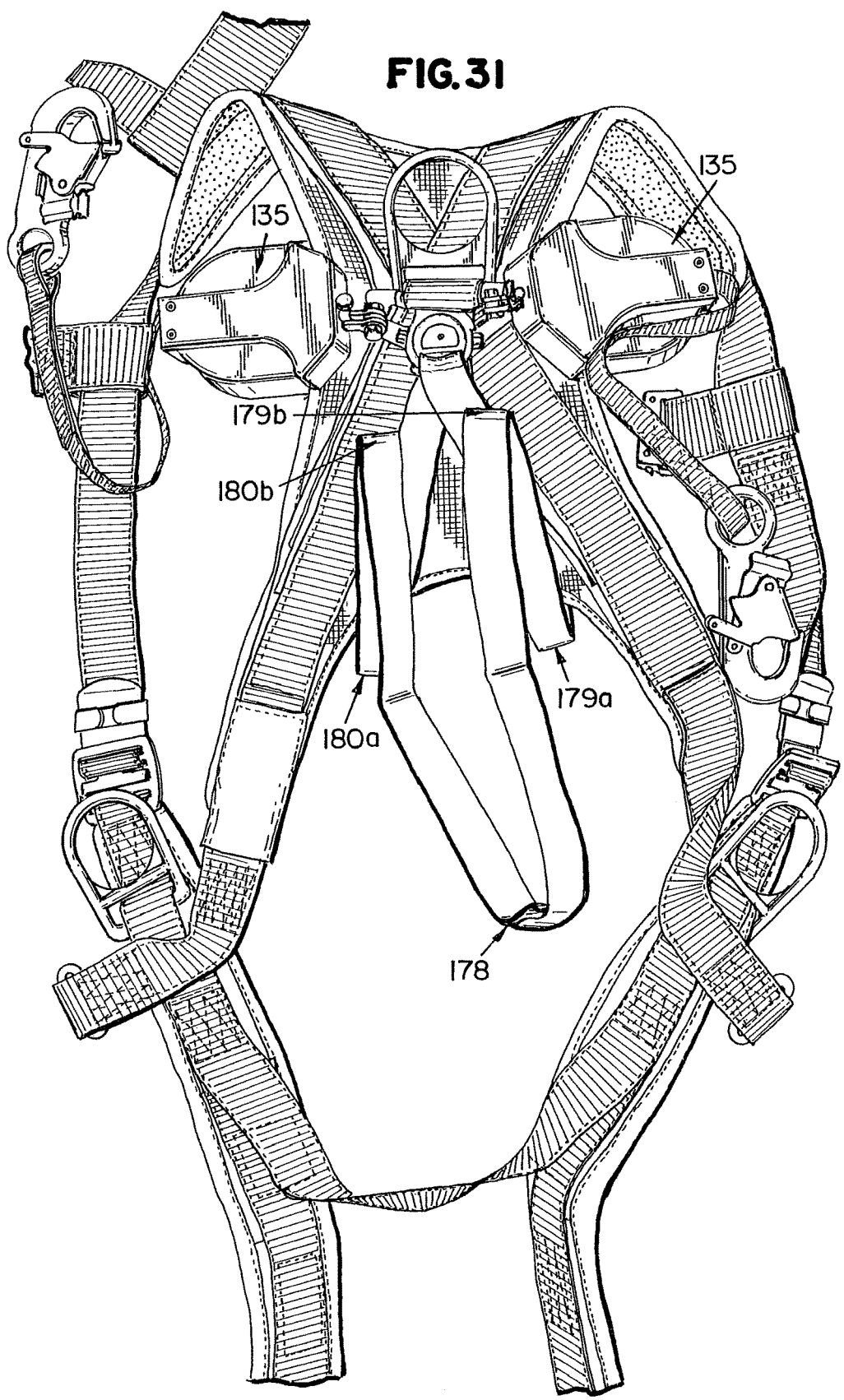
FIG. 31 is a front view of the energy absorber shown in FIG. 30 with an intermediate portion partially unfolded.
Figure 32:
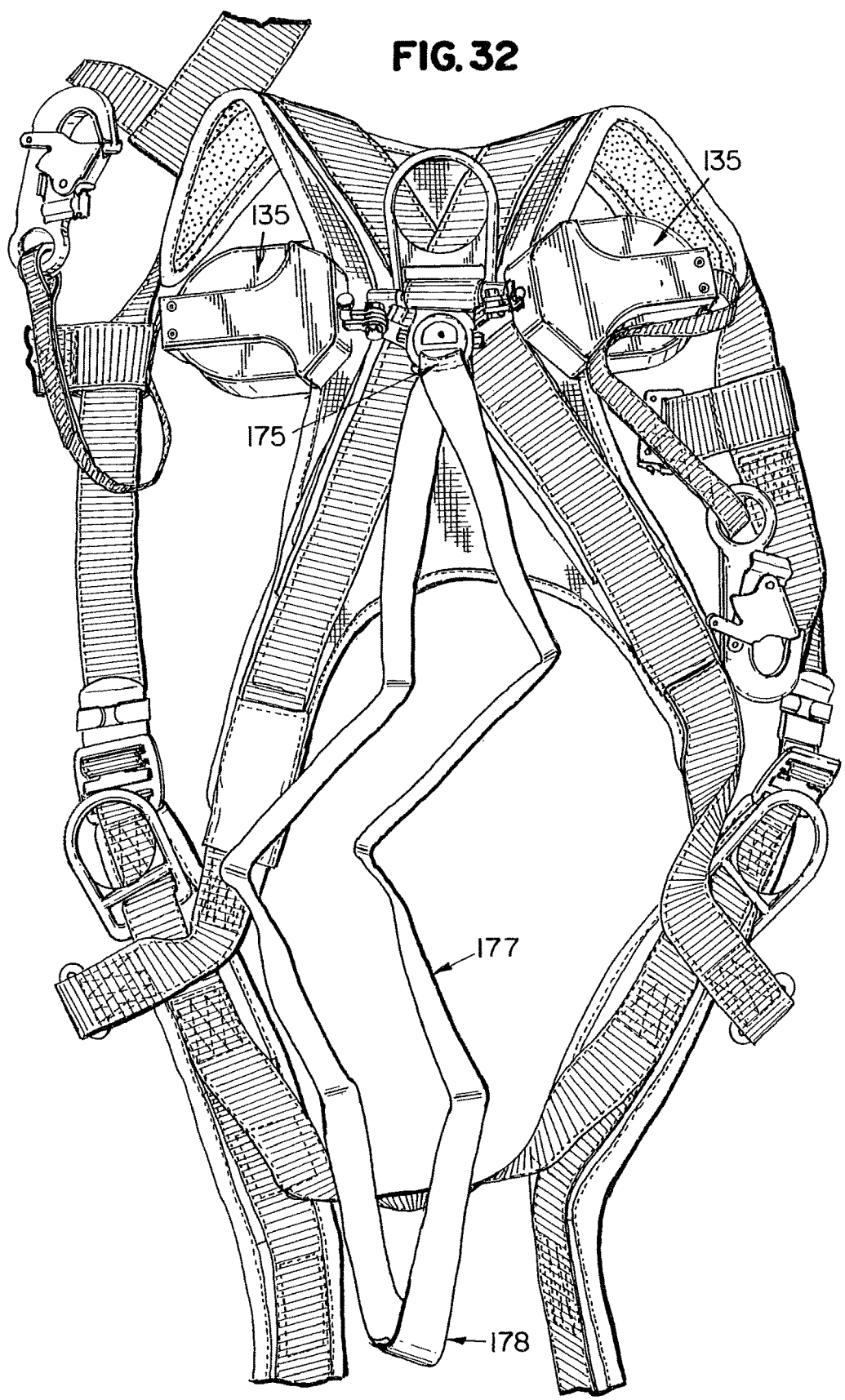
FIG. 32 is a front view of the energy absorber shown in FIG. 30 with the intermediate portion substantially unfolded.
Figure 33:
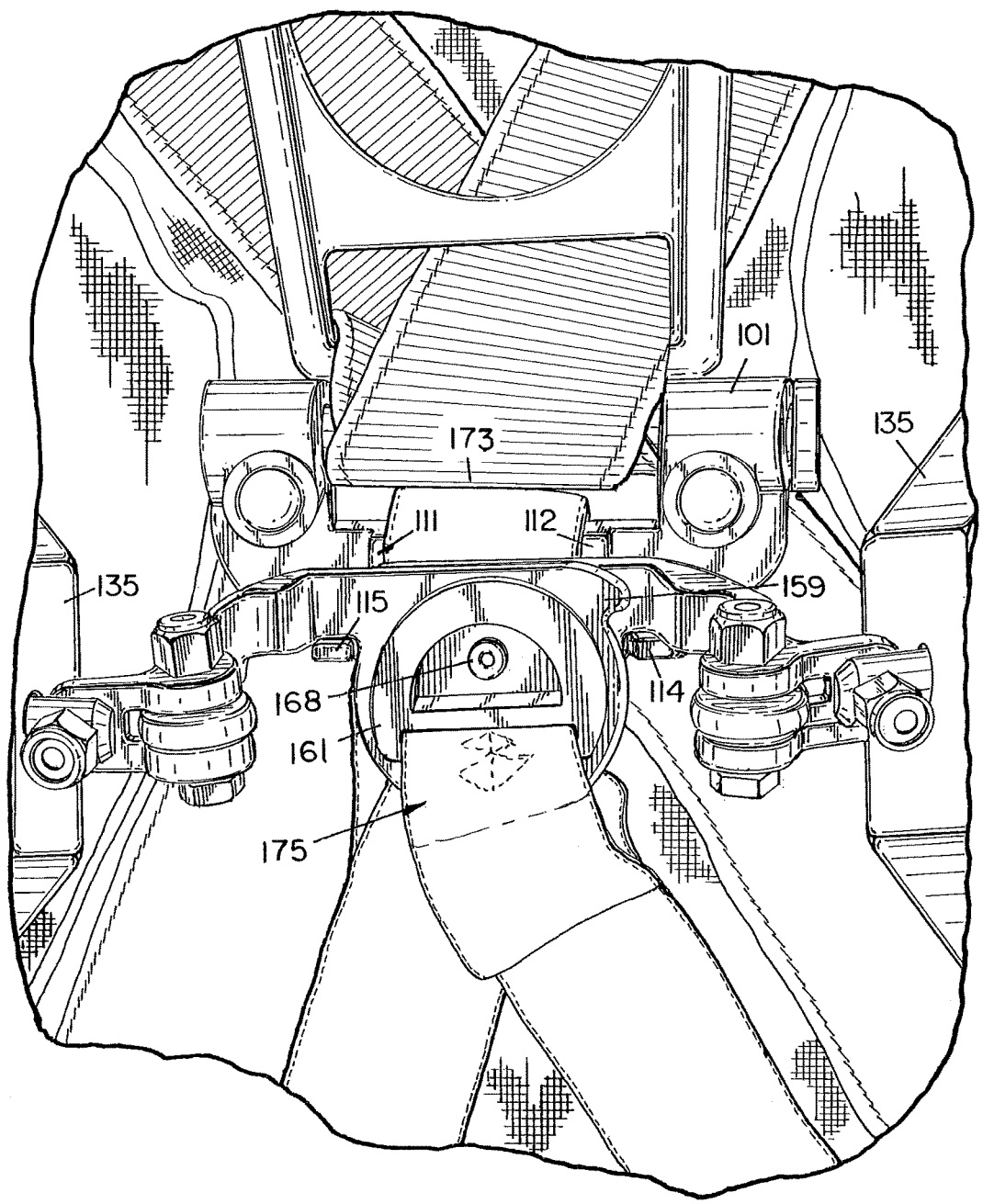
FIG. 33 is a front view of a bracket assembly of the energy absorber assembly shown in FIG. 26.
Figure 34:
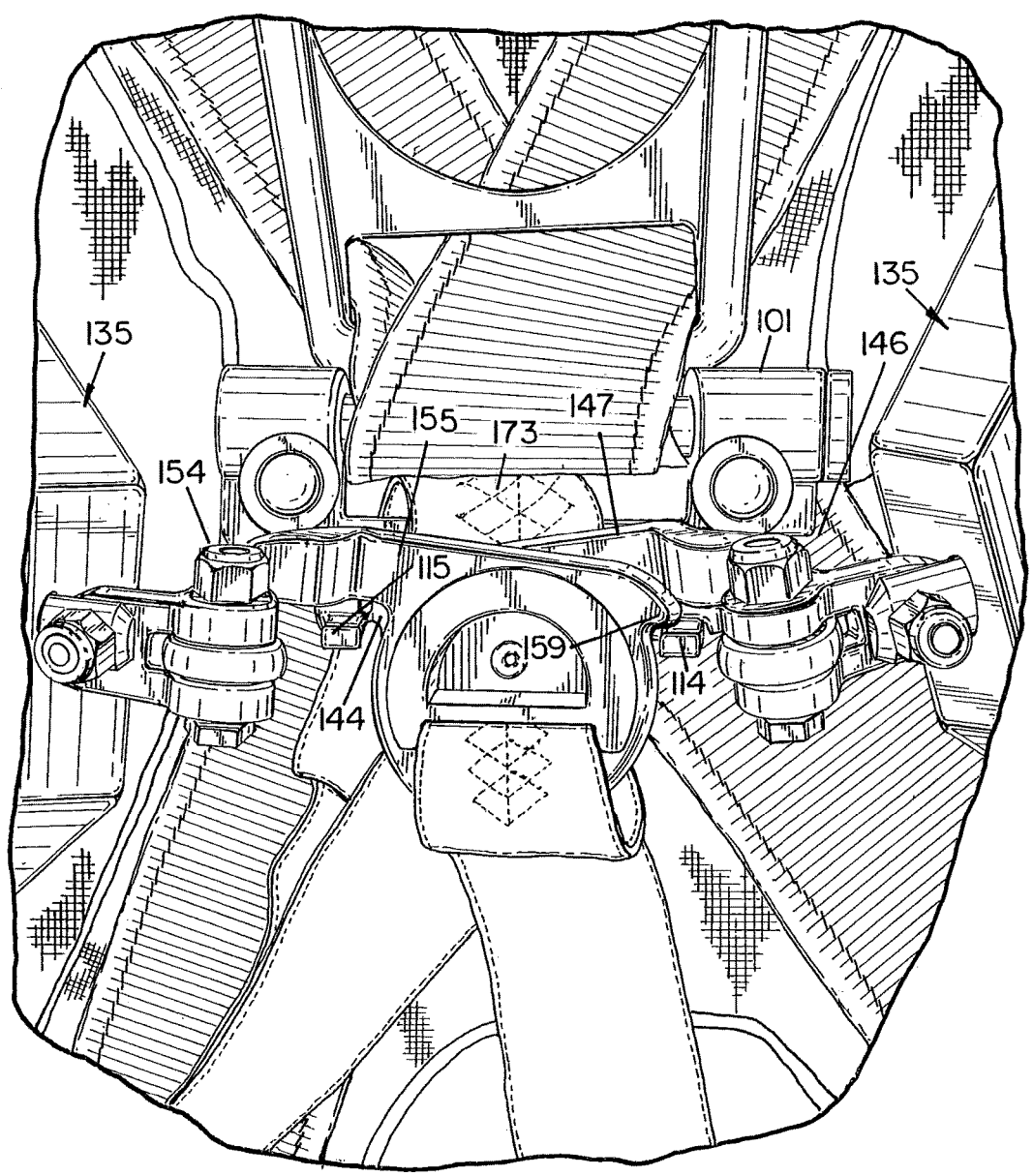
FIG. 34 is a front view of the bracket assembly shown in FIG. 33.
Figure 35:
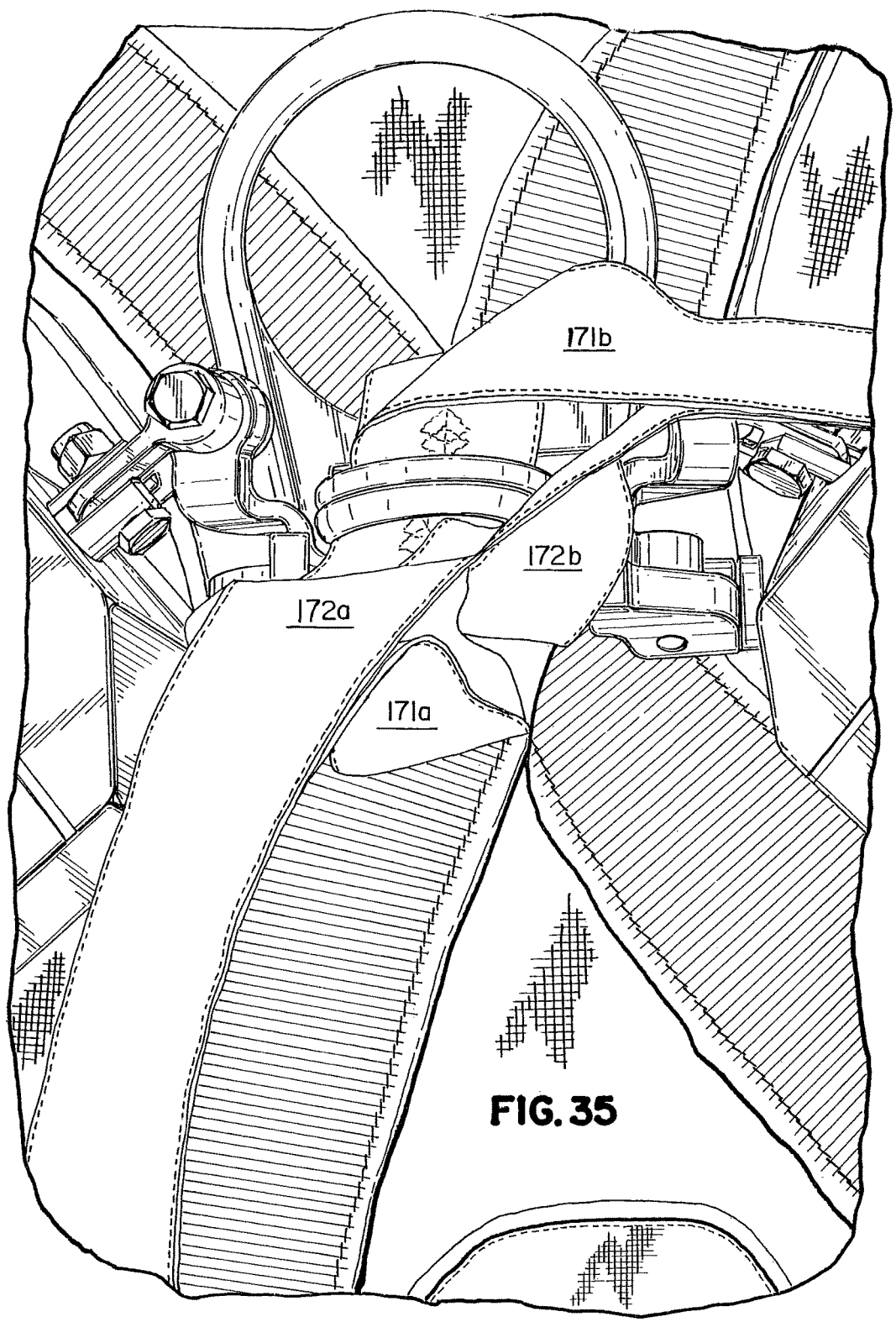
FIG. 35 is a bottom view of first and second bases of the bracket assembly shown in FIG. 33.
Figure 36:
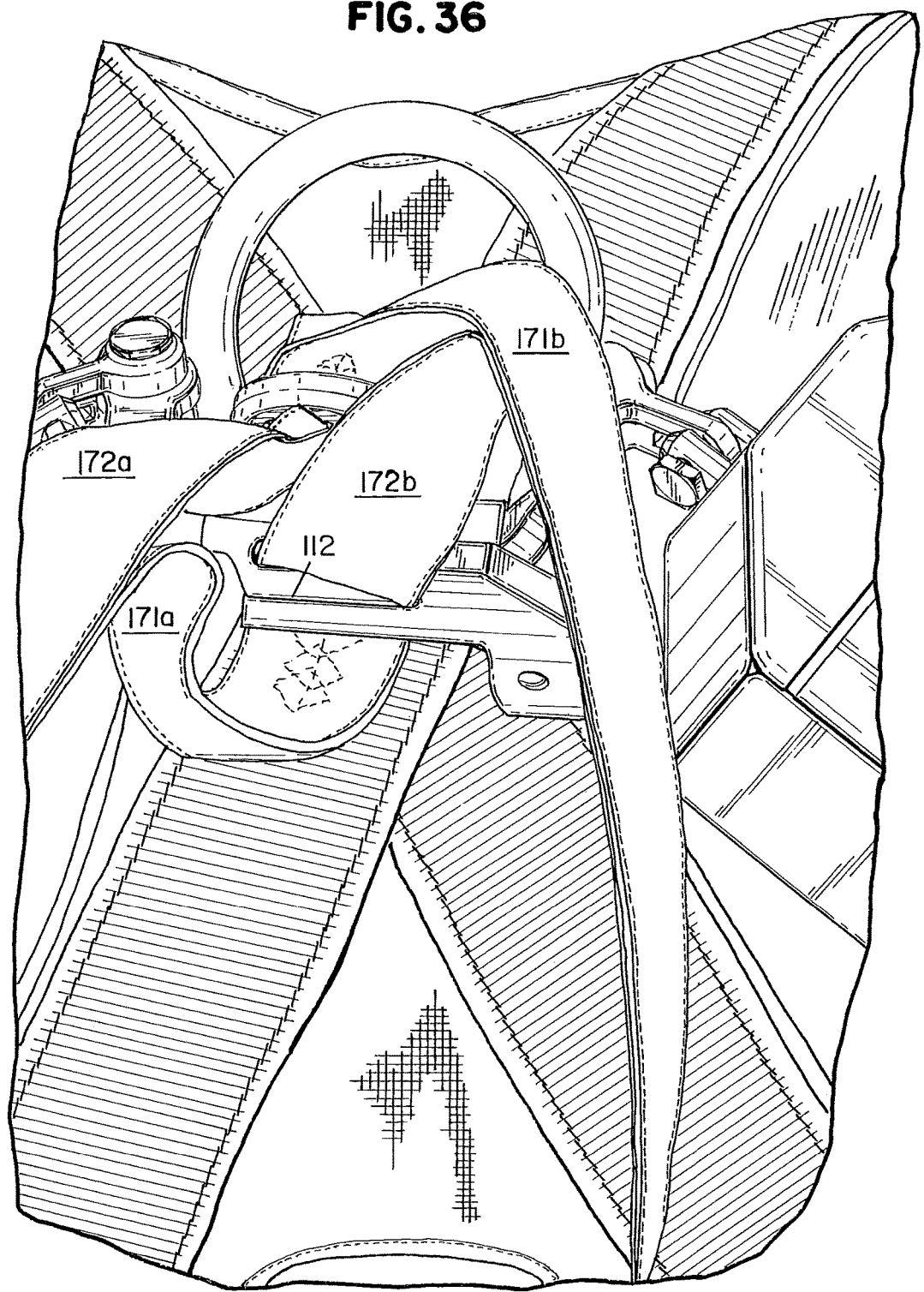
FIG. 36 is a bottom view of a connector of the energy absorber assembly shown in FIG. 26.
Figure 37:
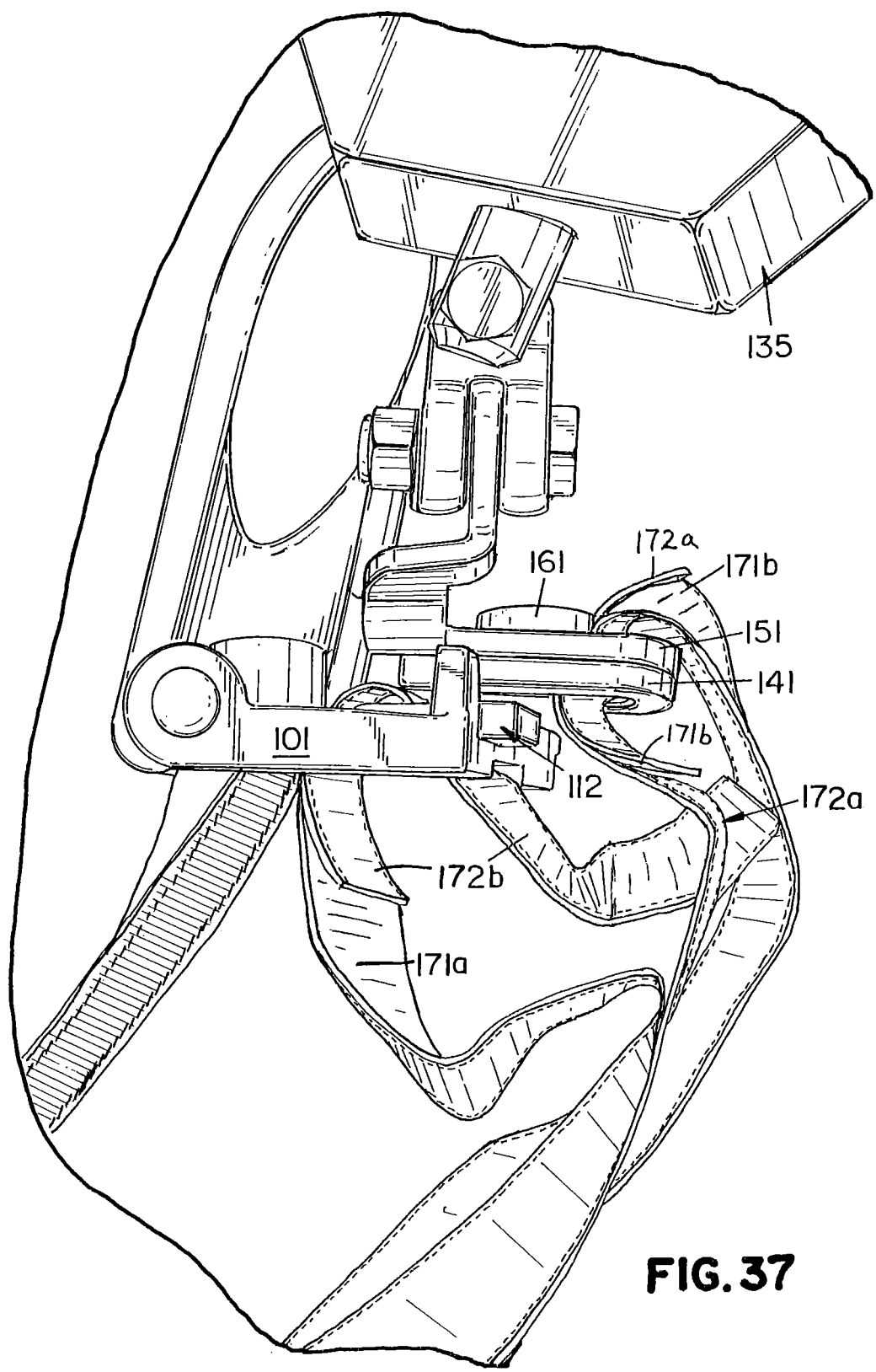
FIG. 37 is a side view of the energy absorber assembly with the cover removed to show how the energy absorber is connected to the connector and the bracket assembly.

After the energy absorber 170 is connected to the other components, it is folded to form an upside down V-shape, which corresponds to the shape of the shoulder straps of the safety harness. The energy absorber 170 includes a first side 179, a second side 180, and a bottom portion 178, which interconnects the sides 179 and 180. It does not matter on which sides of the safety harness the sides 179 and 180 of the energy absorber 170 are positioned. Generally, as shown in FIGS. 30-32, each side of the energy absorber 170 is folded three times so that each segment between folds is approximately the same length. The first side 179 includes a first fold 179a, a second fold 179b, and a third fold 179c. The second side 180 includes a first fold 180a, a second fold 180b, and a third fold 180c. The bottom portion 178 is positioned proximate the connections 173 and 175, which form the point of the "V". Once positioned in a folded configuration, a cover 190 can be positioned about the energy absorber 170 to assist in keeping it in its folded configuration.

As shown in at least FIGS. 26-29, the cover 190 is generally a sleeve having an upside down V-shaped configuration corresponding to the energy absorber 170 in its folded configuration. The cover 190 includes a top portion 191, a first leg 192a, and a second leg 192b. Proximate the bottom, the first leg 192a includes a first strap 193a with a first end 194a, a second end 196a, and a first fastener assembly 197a, which is configured and arranged to releasably connect the ends 194a and 196a. Proximate the bottom, the second leg 192b includes a second strap 193b with a first end 194b, a second end 196b, and a second fastener assembly 197b, which is configured and arranged to releasably connect the ends 194b and 196b. As shown, each of the fastener assemblies 197a and 197b includes mating hook and loop but it is recognized that other suitable fastener assemblies could be used to connect the respective ends.

The front side 198 of the cover 190 is shown in FIG. 28. A flap portion 199 extends upward from the top portion 191 and includes a first portion 200 of a fastener, for example one of mating hook and loop. The rear side 201 of the cover 190 is shown in FIG. 29. The top portion 191 includes an opening 203 between the front side 198 and the rear side 201, which form a cavity 204 therebetween. The rear side 201 includes a second portion 202 of the fastener, for example, the other of mating hook and loop.

Figure 26:
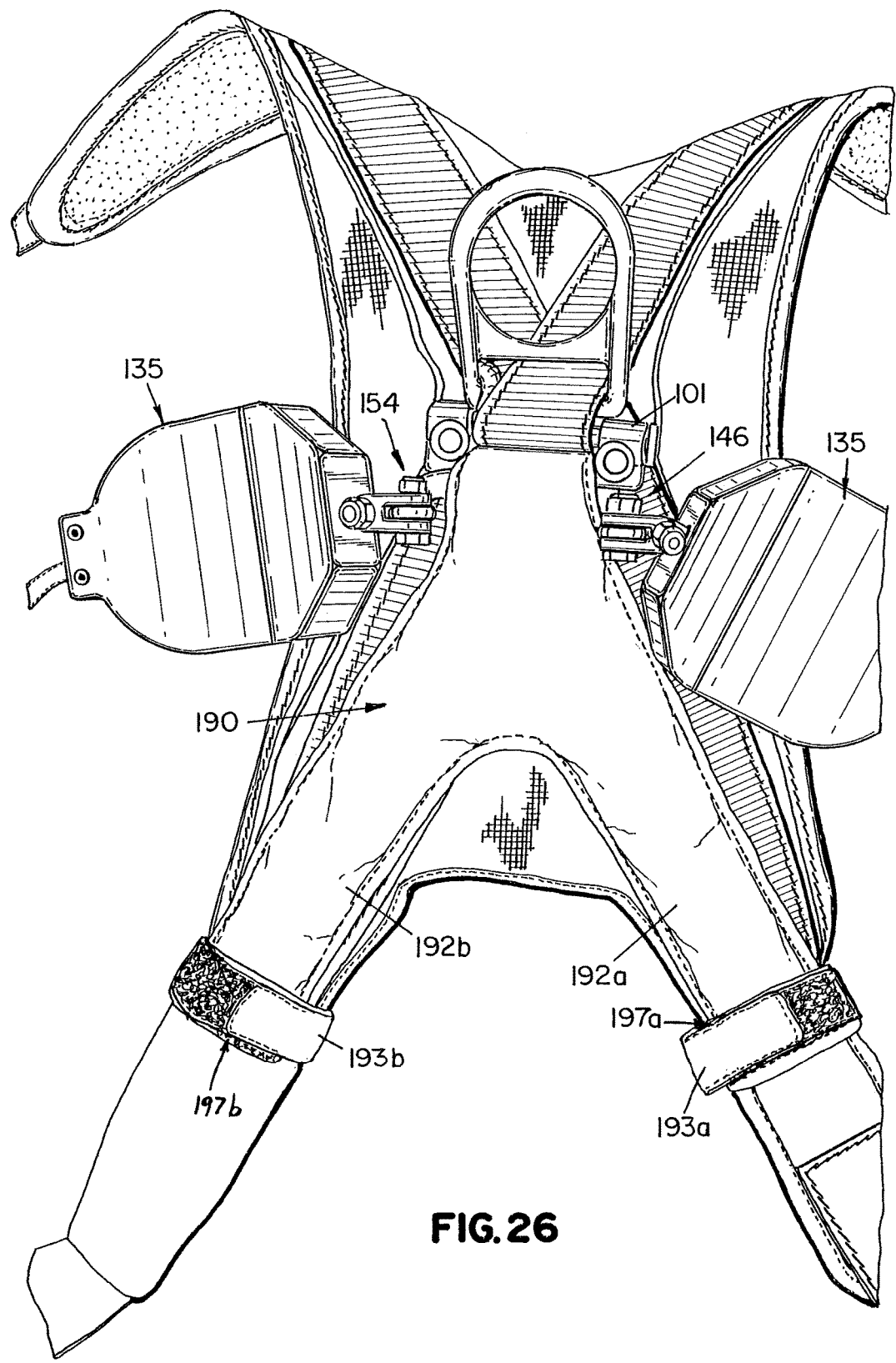
FIG. 26 is a front view of another embodiment energy absorber assembly operatively connected to a safety harness and two self-retracting lifelines.

To put the cover 190 on the energy absorber 170, the first side 179 is inserted through the opening 203 and in the cavity 204 proximate the first leg 192a and the second side 180 is inserted through the opening and in the cavity 204 proximate the second leg 192b. The sides 179 and 180 may be positioned in the cavity 204 in any order and even substantially simultaneously. Then, the top portion 191 is inserted through the slot 110 of the connector 101, as shown in FIG. 27, so that it can be inserted through the opening 204 and the fasteners 200 and 202 mate. The straps 193a and 193b are wrapped around the shoulder straps of the safety harness and the ends of the respective straps are connected as shown in FIG. 26.

Should a fall occur, the fastener 168 deforms or breaks so that the bracket assembly 120 disconnects from the connector 101, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

Another embodiment energy absorber assembly 100' is similar to the energy absorber assembly 100 except that it includes a bracket assembly 140 for connecting two self-retracting lifelines 135 to the connector 101. Because the energy absorber assembly 100' is similar to the energy absorber assembly 100, only significant differences will be described in detail.

Figure 8:
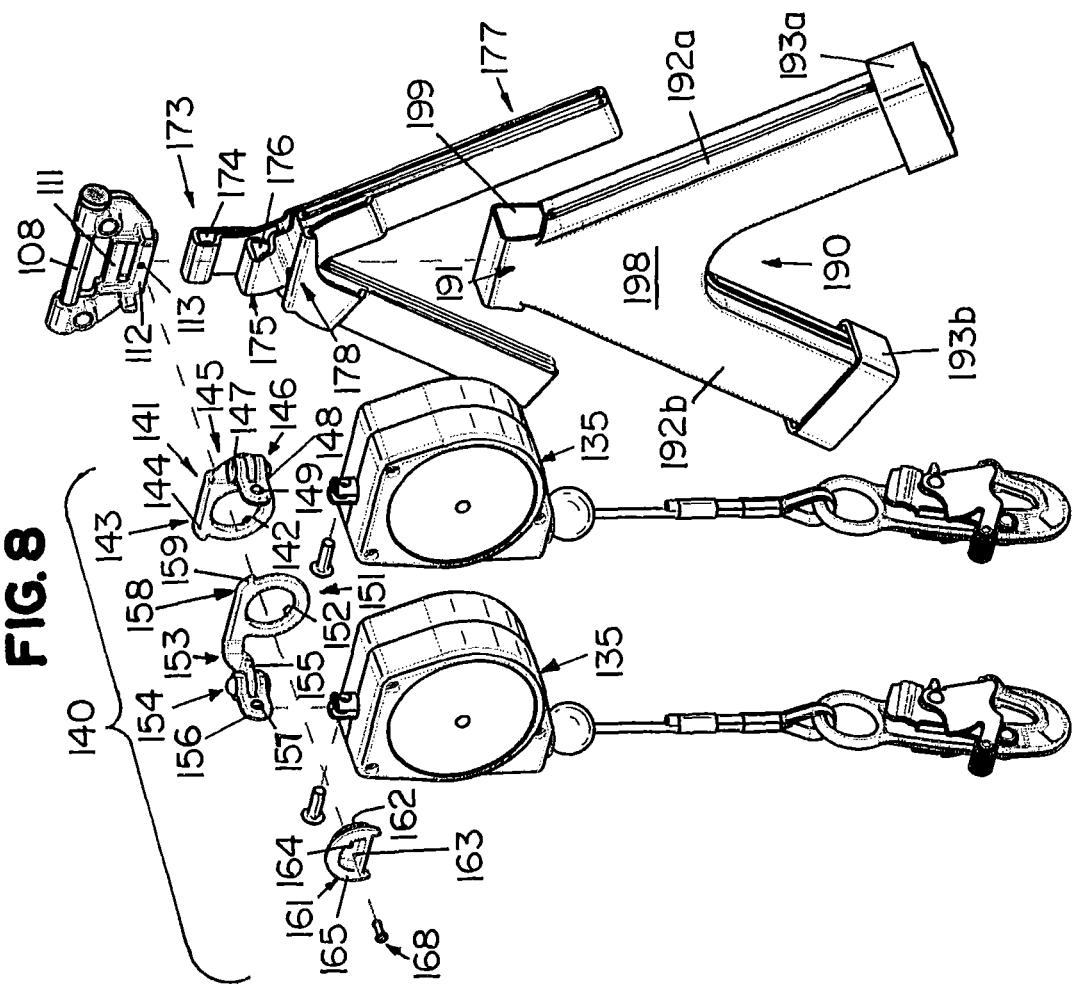
FIG. 8 is an exploded front perspective view of the energy absorber assembly shown in FIG. 7.
Figure 7:
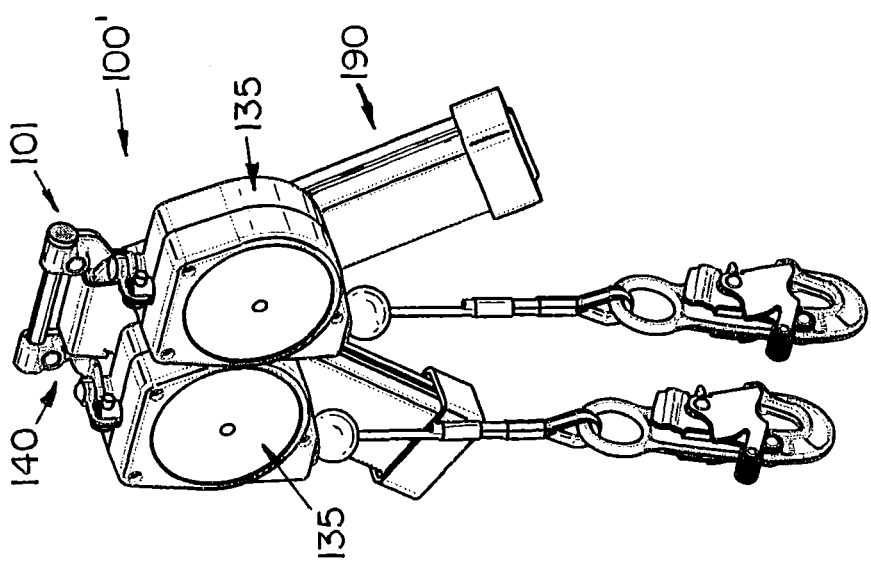
FIG. 7 is a front perspective view of another embodiment energy absorber assembly constructed in accordance with the present invention.

As shown in at least FIGS. 7-9, the bracket assembly 140 includes a first circular base 141 configured and arranged to operatively connect to a first self-retracting lifeline 135 and a second circular base 151 configured and arranged to operatively connect to a second self-retracting lifeline 135.

The first circular base 141, shown in at least FIGS. 17 and 18, is generally ring-like and includes an aperture 142. A first side 143 of the base 141 includes a protrusion 144 extending outward proximate the top, and a second side 145 of the base 141 includes a first swivel connector portion 146 extending outward proximate the top. The first swivel connector portion 146 includes a stationary portion 147, which includes an extension arm 147a and a flange 147b having an aperture 147c. Rather than extending inward in a U-shaped manner like the stationary portion 126 of the bracket assembly 120, the stationary portion 147 extends outward as shown in FIG. 18. A swivel portion 148 is operatively connected to the flange 147b similarly as the swivel portion 127 is operatively connected to the flange 126b. The swivel portion 148 includes an aperture 149 for connecting a self-retracting lifeline 135 thereto as is well known in the art.

The second circular base 151, shown in at least FIGS. 19A and 19B, is generally a mirror image of the first circular base 141. The second circular base 151 is generally ring-like and includes an aperture 152. A first side 153 of the base 151 includes a second swivel connector portion 154 extending outward proximate the top, and a second side 158 of the base 151 includes a protrusion 159 extending outward proximate the top. The second swivel connector portion 154 includes a stationary portion 155 and a swivel portion 156, which are similar to those of the first swivel connector portion 146. The swivel portion 156 includes an aperture 157 for connecting a self-retracting lifeline 135 thereto as is well known in the art.

A base connector 161, shown in at least FIGS. 20-24, is configured and arranged to operatively connect the circular bases 141 and 151 to the connector 101. The base connector 161 is preferably made of nylon. The base connector 161 includes a generally cylindrical portion 162 to which a plate portion 163 is operatively connected proximate one side and a flange portion 165 is operatively connected proximate an opposing side. The plate portion 163 includes an aperture 164 proximate the center of the cylindrical portion 162. A segment is removed from the cylindrical portion 162 to form a bottom 166, which includes an extension 166a extending outward from the plate portion 163. An opening 167 is formed by the flange portion 165 and the bottom 166.

The circular bases 141 and 151, which are preferably made of alloy steel, are positioned together with the swivel connector portions 146 and 154 extending outward from opposing sides and the apertures 142 and 152 aligning. The base connector 161 is inserted through the apertures 142 and 152 so that the ring portions are proximate the cylindrical portion 162. A fastener 168 extends through the aperture 164 and the aperture 113 to connect the base connector 161 to the connector 101. The extension 166a of the base connector 161 is positioned below the second bar portion 112 of the connector 101 to prevent the base connector 161 from pivoting relative to the connector 101. Therefore, the circular bases 141 and 151 are positioned between the connector 101 and the flange portion 165. The circular bases 141 and 151 pivot independently relative to the connector 101 and the base connector 161, and the swivel connector portions 146 and 154 and the protrusions (shoulder portions) 144 and 159 contact the respective protrusions 114 and 115, which act likes stops to limit rotation of the circular bases 141 and 151.

Similar to the bracket assembly 120, the energy absorber 170 is connected to the bracket assembly 140 by inserting one of the second end 171b of the first portion 171 and the first end 172a of the second portion 172 through the apertures 142 and 152 from one side of the circular bases 141 and 151, the other of the second end 171b of the first portion 171 and the first end 172a of the second portion 172 is positioned proximate the other side of the circular bases 141 and 151, and the ends 171b and 172a are operatively connected, such as by stitching, as a second connection 175 to form a second loop 176 about the ring portions of the bases 141 and 151. The energy absorber 170 may be connected to the bracket assembly 140 before the base connector 161 is inserted through the apertures 142 and 152 or after the base connector is inserted through the apertures 142 and 152 and connected to the connector 101.

Should a fall occur, the fastener 168 deforms or breaks so that the base connector 161 disconnects from the connector 101 thereby releasing the circular bases 141 and 151 from the connector, the top portion 191 of the cover 190 disconnects from the rear side 201, and the portions 171 and 172 of the energy absorber 170 begin to separate and come out of the cover 190 thereby reducing the rate of fall and the amount of force exerted on the user from the fall. Depending upon the distance of the fall, varying lengths of the portions 171 and 172 could separate.

FIG. 9 illustrates how the circular bases 141 and 151 may be positioned during a fall. The connector 101 is operatively connected to the user's safety harness, and the first self-retracting lifeline 135a is operatively connected to a support structure. As the portions 171 and 172 of the energy absorber 170 separate, the second self-retracting lifeline 135b simply slides along a portion of the energy absorber 170 as the portions 171 and 172 continue to separate. If the second self-retracting lifeline 135b were connected to a support structure, the first self-retracting lifeline would similarly slide along a portion of the energy absorber 170 as the portions 171 and 172 separate.

The above specification, examples, and data provide a complete description of the manufacture and use of the composition of embodiments of the invention. Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the invention. Therefore, it is manifestly intended that this invention be limited only by the claims and the equivalents thereof.

The invention claimed is:

1. An energy absorber assembly for use with a safety harness and a lifeline, the energy absorber assembly comprising:
    a connector configured and arranged to operatively connect directly to the safety harness;
    a bracket assembly including a base having a swivel connector, the swivel connector configured and arranged to operatively connect to the lifeline;
    a fastener directly connecting the bracket assembly and the connector, the base being pivotable with respect to the fastener relative to the connector, the fastener configured to release the bracket assembly from the connector when the bracket assembly is subjected to a predetermined load; and
    an energy absorber interconnecting the bracket assembly and the connector, the energy absorber including a first portion and a second portion configured to separate to absorb shock after the bracket assembly is released from the connector.

2. The energy absorber assembly of claim 1, wherein the bracket assembly comprises:

a bracket base having a slot forming a tab portion with an aperture and a bar portion, the aperture configured and arranged to receive the fastener, the bar portion configured and arranged to be engaged by the energy absorber.

3. The energy absorber assembly of claim 1, further comprising at least one protrusion extending outward from the connector configured to limit rotation of the base relative to the connector.

4. The energy absorber assembly of claim 1, wherein the bracket assembly is configured and arranged to be operatively connected to the lifeline which includes a first lifeline and a second lifeline.

5. The energy absorber assembly of claim 4, wherein the bracket assembly comprises:
  the base including a first base and a second base, the swivel connector including a first swivel connector and a second swivel connector;
  the first base having a first base aperture and a first lifeline connector operatively connected to the first swivel connector, the first lifeline connector being configured and arranged to engage the first lifeline;
  the second base having a second base aperture and a second lifeline connector operatively connected to the second swivel connector
  the second lifeline connector being configured and arranged to engage the second lifeline;
  a base connector having a plate portion with a base connector aperture and a flange, the base connector being configured and arranged to extend through the first and second base apertures, the base connector aperture configured and arranged to receive the fastener, the flange configured to prevent the first and second bases from sliding off the base connector, the first and second bases being configured and arranged to be engaged by the energy absorber.

6. The energy absorber assembly of claim 1, wherein the energy absorber has an upside down V-shaped configuration.

7. The energy absorber assembly of claim 6, in combination with the safety harness, further comprising a cover interconnecting the energy absorber and the safety harness.

8. The energy absorber assembly of claim 7, wherein the cover has a top portion configured and arranged to releasably engage the bracket assembly, a first leg configured and arranged to releasably engage a first strap of the safety harness, and a second leg configured and arranged to releasably engage a second strap of the safety harness.

9. An energy absorber assembly for use with a safety harness and a lifeline, the energy absorber assembly comprising:
  a fastener;
  a connector configured and arranged to operatively connect directly to the safety harness;
  a bracket assembly including a base and at least one swivel connector portion, the base having an aperture, the aperture configured and arranged to receive the fastener, the base configured and arranged to be engaged by an energy absorber, the at least one swivel connector portion being configured and arranged to engage the lifeline, the fastener operatively connecting the base and the connector, the bracket assembly being pivotable with respect to the fastener relative to the connector, the fastener configured to release the bracket assembly from the connector when the bracket assembly is subjected to a predetermined load; and
  the energy absorber assembly further comprising the energy absorber interconnecting the bracket assembly and the connector, the energy absorber including a first portion and a second portion configured to separate to absorb shock after the bracket assembly is released from the connector.

10. The energy absorber assembly of claim 9, further comprising at least one protrusion extending outward from the connector configured to limit rotation of the bracket assembly relative to the connector.

11. The energy absorber assembly of claim 9, wherein the lifeline comprises a first lifeline and a second lifeline, and wherein the bracket assembly comprises:
  the base including a first base portion, a second base portion, and a base connector;
  the first base portion having a first base aperture and a first lifeline connector operatively connected to a first one of the at least one swivel connector portion, the first lifeline connector being configured and arranged to engage the first lifeline;
  the second base portion having a second base aperture and a second lifeline connector operatively connected to a second one of the at least one swivel connector portion, the second lifeline connector being configured and arranged to engage the second lifeline; and
  the base connector having a plate portion with the aperture and a flange, the base connector being configured and arranged to extend through the first and second base apertures, the flange and the connector configured to prevent the first and second base portions from sliding off the base connector, the first and second base portions configured and arranged to be engaged by the energy absorber.

12. The energy absorber assembly of claim 9, wherein the energy absorber has an upside down V-shaped configuration.

13. The energy absorber assembly of claim 12 in combination with the safety harness, further comprising a cover interconnecting the energy absorber and the safety harness.

14. The energy absorber assembly of claim 13 in combination with the safety harness, wherein the cover has a top portion configured and arranged to releasably engage the bracket assembly, a first leg configured and arranged to releasably engage a first strap of the safety harness, and a second leg configured and arranged to releasably engage a second strap of the safety harness.

15. An energy absorber assembly for use with a safety harness and a first and second lifelines, the energy absorber assembly comprising:
  a connector configured and arranged to operatively connect directly to the safety harness,
  a bracket assembly comprising:
    a first base comprising a first swivel connector configured and arranged to be operatively connected to the first lifeline,
    a second base comprising a second swivel connector configured and arranged to be operatively connected to the second lifeline, and
    a base connector,
    the first and second bases being pivotable relative to the connector;
  a fastener directly connecting the connector and the bracket assembly, the first and second bases being pivotable with respect to the fastener relative to the connector, the fastener configured to release the bracket assembly and the first and second lifelines from the connector when the bracket assembly is subjected to a predetermined load; and
  an energy absorber interconnecting the bracket assembly and the connector, the energy absorber including a first portion and a second portion that configured to separate to absorb shock after the bracket assembly is released from the connector.

16. The energy absorber assembly of claim 15, further comprising at least one protrusion extending outward from the connector configured to limit rotation of the first and second bases relative to the connector.

17. The energy absorber assembly of claim 15, wherein the energy absorber has an upside down V-shaped configuration.

18. The energy absorber assembly of claim 17, further comprising a cover interconnecting the energy absorber and the safety harness.

19. The energy absorber assembly of claim 18, wherein the cover has a top portion configured and arranged to releasably engage the bracket assembly, a first leg configured and arranged to releasably engage a first strap of the safety harness, and a second leg configured and arranged to releasably engage a second strap of the safety harness.

20. The energy absorber assembly of claim 15, wherein the first base further comprises a first lifeline connector configured and arranged to allow the first lifeline to swivel relative to the first base, and wherein the second base further comprises a second lifeline connector configured and arranged to allow the second lifeline to swivel relative to the second base.

* * * * *

UNITED STATES PATENT AND TRADEMARK OFFICE
CERTIFICATE OF CORRECTION

PATENT NO. : 10,016,638 B2
APPLICATION NO. : 14/860860
DATED : July 10, 2018
INVENTOR(S) : Scott C. Casebolt Page 1 of 1

It is certified that error appears in the above-identified patent and that said Letters Patent is hereby corrected as shown below:

Column 9
Line 25, Claim 5, delete "connector" and insert -- connector, --, therefor.

Column 10
Line 45, Claim 15, delete "and a" and insert -- and --, therefor.

Column 11
Line 1, Claim 15, delete "portion that" and insert -- portion --, therefor.

Signed and Sealed this
Eleventh Day of September, 2018

Andrei Iancu
*Director of the United States Patent and Trademark Office*